Jan. 31, 1961

A. M. NELSON ET AL 2,969,979

CARD PROCESSING APPARATUS

Filed March 12, 1957

INVENTORS:
Alfred M. Nelson
Allan Orner

By Smyth & Roston
Attorneys

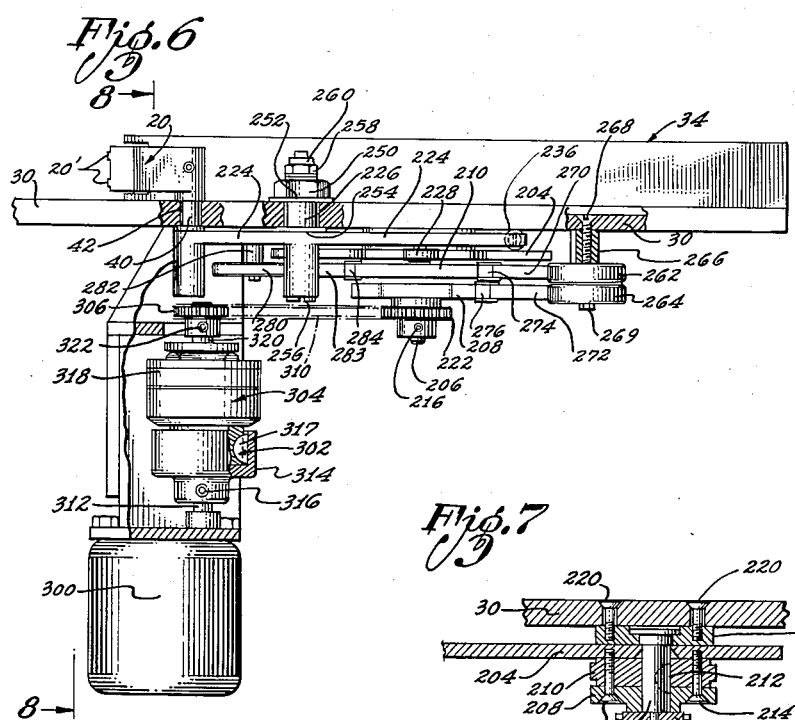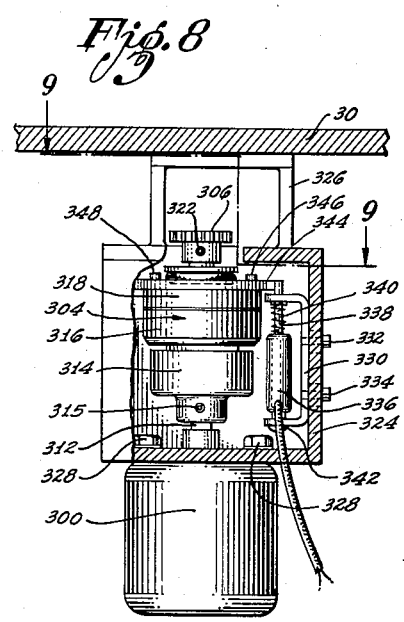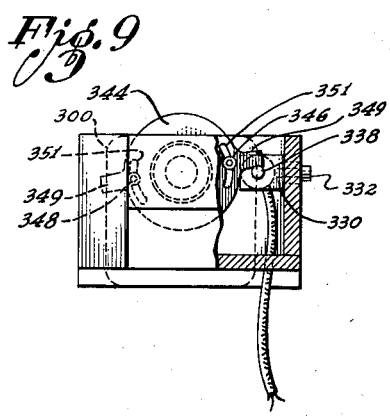

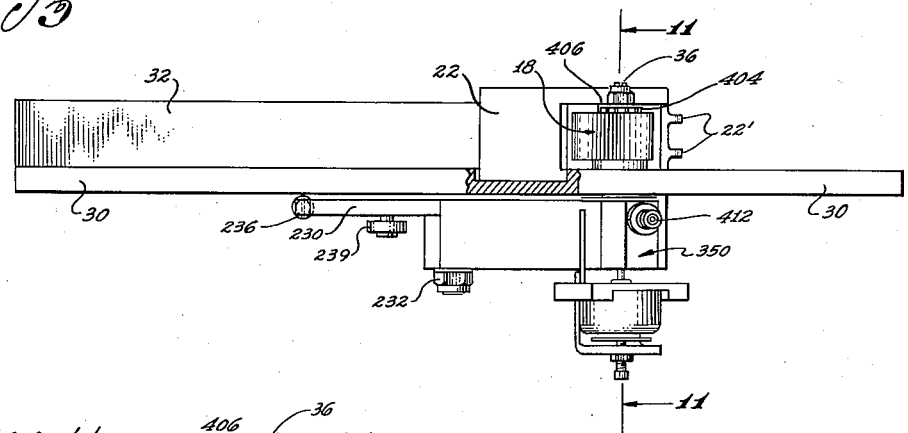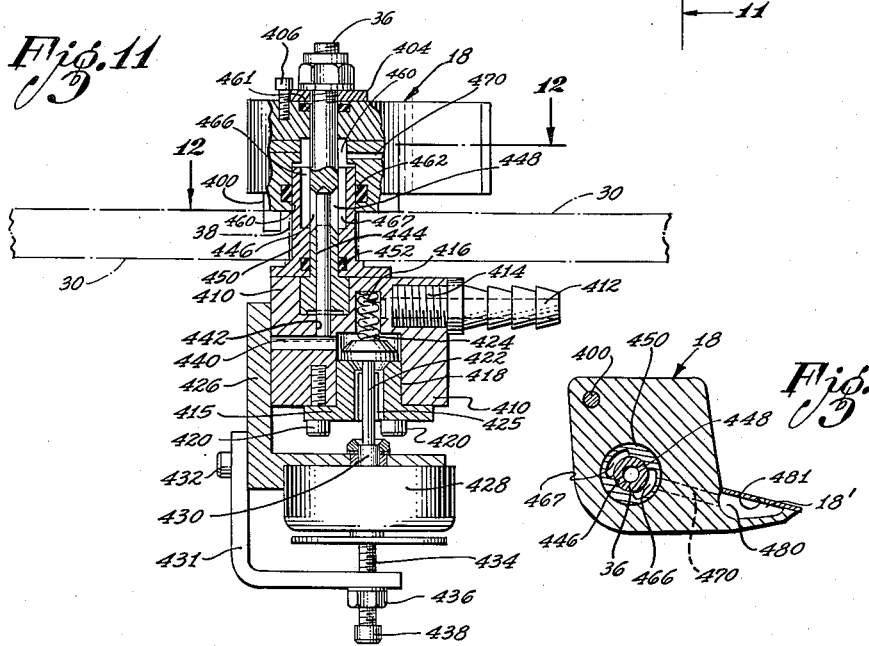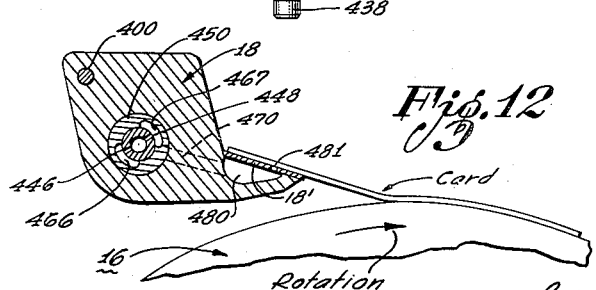

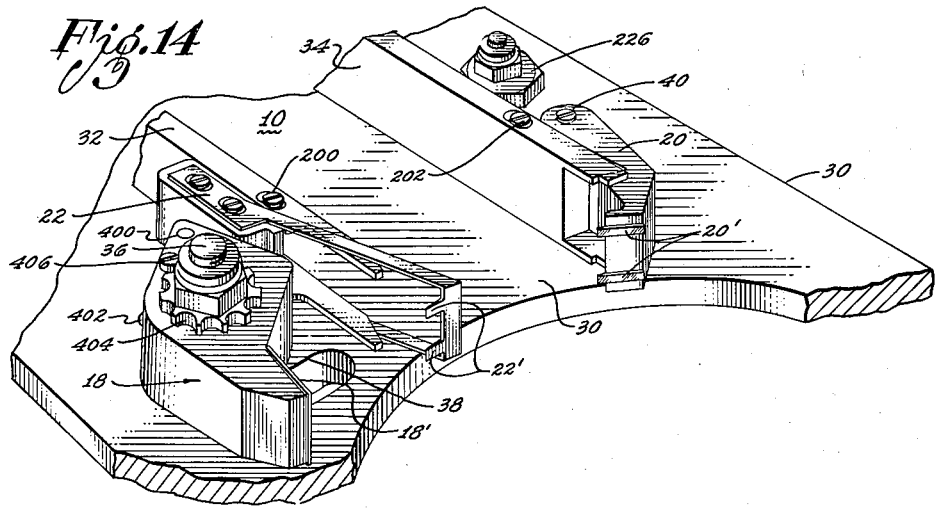
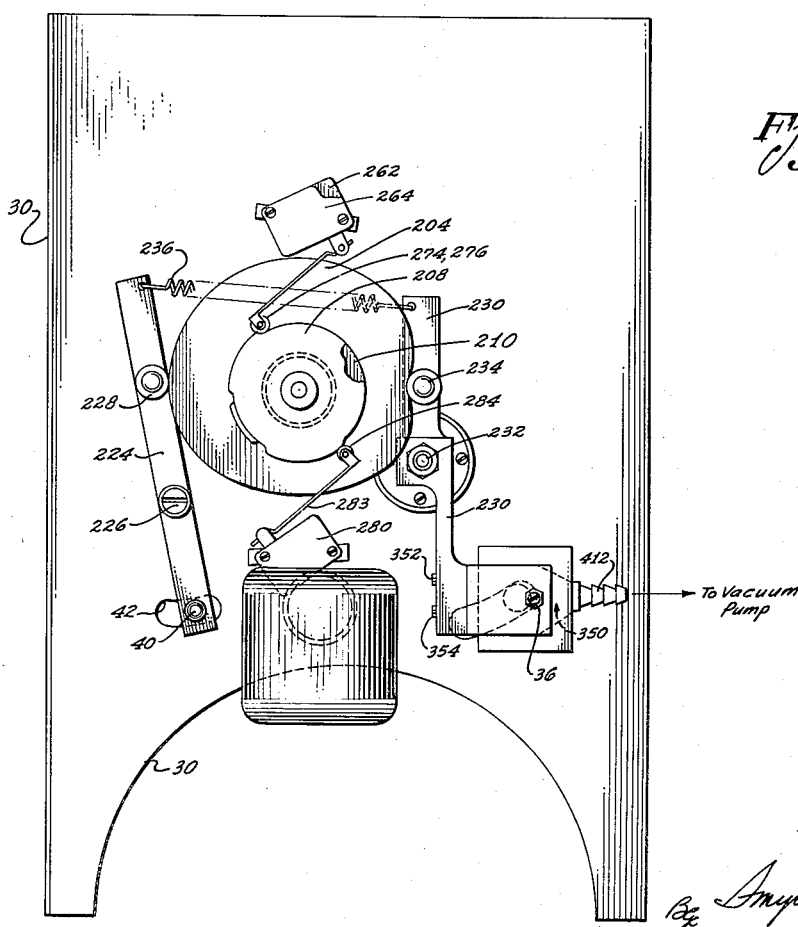

Jan. 31, 1961   A. M. NELSON ET AL   2,969,979
CARD PROCESSING APPARATUS
Filed March 12, 1957   10 Sheets-Sheet 9
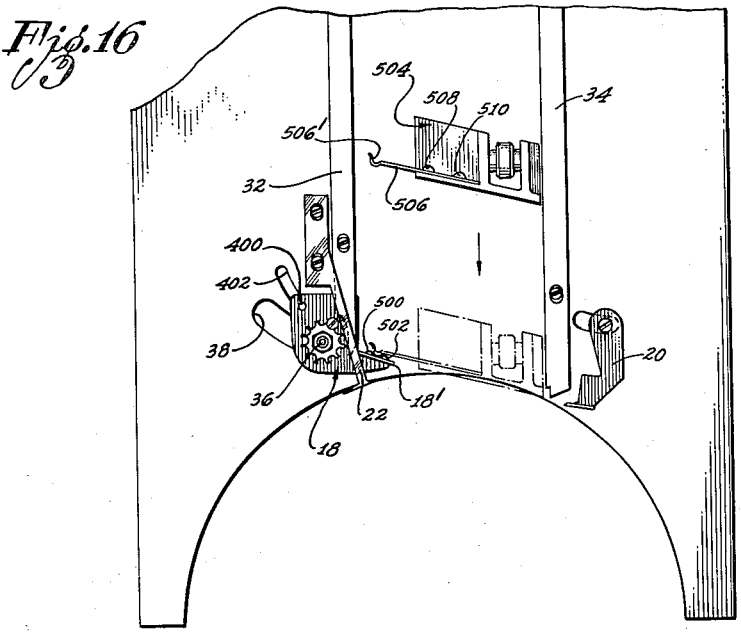
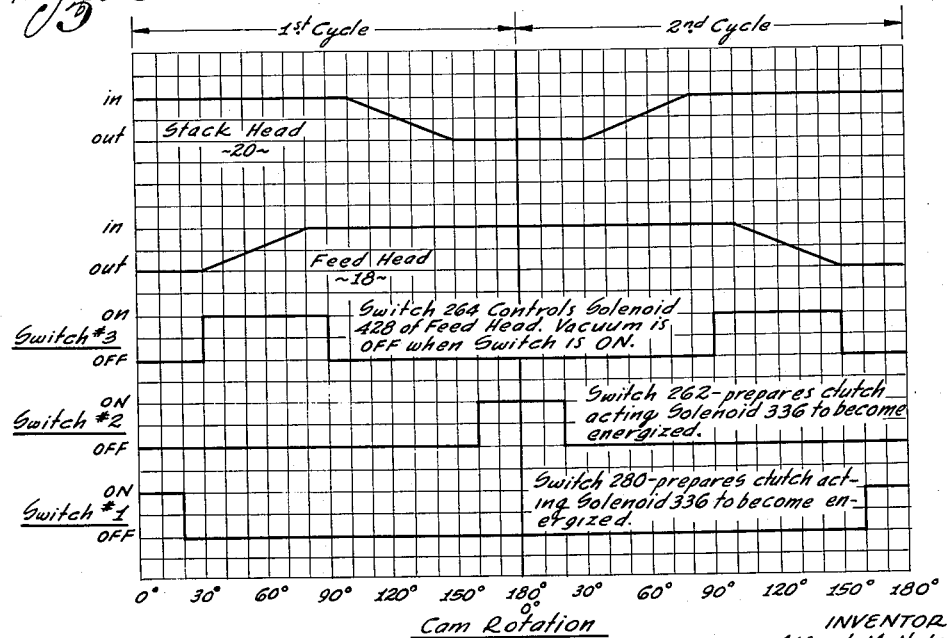
INVENTORS:
Alfred M. Nelson
Allan Orner

Fig. 17

United States Patent Office 2,969,979
Patented Jan. 31, 1961

2,969,979

CARD PROCESSING APPARATUS

Alfred M. Nelson, Redondo Beach, and Allan Orner, Los Angeles, Calif., assignors to Magnavox Company, Los Angeles, Calif., a corporation of Delaware Filed Mar. 12, 1957, Ser. No. 645,639

32 Claims. (Cl. 271—5)

The present invention relates to a system and apparatus for handling a multiplicity of information storage cards. The invention is more particularly concerned with a reversible feeding and stacking station which includes apparatus having a first operational mode in which cards are fed in sequence from a card holder or storage stack to the periphery of a rotatable transporting drum. As a part of the invention, the apparatus is provided with a second operational mode in which cards are stripped from the transporting drum and deposited in the storage stack.

In the field of data processing, digital techniques have been used to store a wide variety of information and to assimilate such information for subsequent use. In one type of data processing system, the information is stored on a plurality of cards. Each card is provided with a plurality of positions for storing discrete bits of information on one or both of its sides. This information may be stored in the form of magnetic areas of one polarity or another, in the form of holes punched in the cards in accordance with a predetermined code, or in any other appropriate form.

Thousands of such information storage cards are used in complex data processing systems so that the millions of bits of information that are required to represent the data utilized in such systems may be appropriately stored. Information storage cards are maintained in a stacked relationship in the processing systems in appropriate card holders, and these cards are sequentially transferred to a first vacuum transport drum from the holders and from the first drum to other associated drums to obtain a processing of the cards. Upon the completion of the processing operation, the cards are returned either to the same or different stacks for subsequent use. This return is made usually in the original order of the cards but may be made in a different type of order dependent upon the operation being performed.

Prior to the apparatus and system described and claimed in copending application Serial No. 538,111, filed October 3, 1955, for Robert M. Hayes, one type of apparatus was required to control the transfer of cards from a card holder to a transporting drum, and a second separate and independent type of apparatus was required for depositing the cards from a drum into a card holder. Copending application Serial No. 538,111 provides improved apparatus which is capable of operating in a first operational mode to control the transfer of cards from a card holder to a transport drum and which is capable of operating in a second operational mode to strip cards from the drum and to deposit such cards in the card holder.

The apparatus of the copending application simplifies many data processing systems to a large extent and increases the flexibility in the system operations. Specifically, the apparatus of the copending application permits cards to be fed from a particular stack to a transporting drum for subsequent processing and then to be returned automatically to the same stack after the processing has been completed. The apparatus of the copending application also permits a convenient interchange of cards between two or more stacks for sorting or collating purposes. In these and in many other systems, reductions in complexity are realized by using the reversible apparatus of the copending application.

The reversible feeding-stacking station and apparatus of the copending application utilizes mechanical linkages and members to accomplish its desired dual purpose.

The present invention also provides a reversible feeding-stacking station which is intended to accomplish the purposes of the station of the copending application. However, the dual purpose feeding-stacking station and apparatus of the present invention utilizes pneumatic or vacuum pressure principles rather than strictly mechanical linkages to retain the cards in the holder and for controllably feeding the cards from the holder to the transporting drum. This use of vacuum pressure enables certain simplifications to be made in the construction and over-all design of the apparatus of the present invention.

The invention provides a dual-purpose feeding and stacking apparatus which includes a vacuum-pressure feedhead or card retainer. This feedhead is pivotally mounted in a preferred embodiment of the invention for cam operation. When the apparatus is conditioned to feed cards controllably from its associated holder to a transporting drum, the feedhead is pivoted to an operating position. When the feedhead is in its operating position, the construction is such that a vacuum pressure may be controllably provided at one of its surfaces. This vacuum pressure is exerted on the leading card in the holder, which card is also under the influence of the vacuum pressure at the periphery of the transporting drum. The vacuum pressure exerted on the card by the feedhead, however, is sufficient to overcome that exerted by the drum and the card is retained in the holder.

A solenoid-controlled valve is disposed in the line providing the vacuum pressure to the feedhead. This valve is controllable to interrupt the vacuum pressure at the surface of the feedhead in order to release the leading card to the transporting drum. By periodically energizing the solenoid valve to interrupt the vacuum pressure at the surface of the feedhead, the cards in the card holder can be released sequentially to the transporting drum.

The periodic interruption of the vacuum pressure at the surface of the feedhead is obtained by periodically introducing a pulse of electric current to the energizing winding of the solenoid valve in the feedline. This pulse of current causes the solenoid valve to seat and interrupt the vacuum air pressure. This interruption is normally made for a time interval only long enough to permit a single card to be released from the card holder to the periphery of the transporting drum.

Therefore, when the feedhead is in its operating position, cards can be successively released from the card holder to the transporting drum by repeatedly pulsing the energizing winding of the solenoid valve in the feedline to the feedhead. In the absence of such a pulse, vacuum air pressure is continually fed to the surface of the feedhead to retain the cards in the card holder.

When the apparatus of the invention is to be used as a stacking station, the feedhead is pivoted by a suitable cam mechanism (which will be described) to an inoperative position, and a stackhead is pivoted at the same time from an inoperative to an operative position. When in its operative position, this stackhead is capable of stripping cards from the periphery of the transporting drum and for depositing such cards in the card holder.

When the feedhead is pivoted to its inoperative position to provide an operation of the reversible station in the stacking mode, it is desirable that the vacuum pressure to the surface of the feedhead be discontinued. If this were not done, the vacuum pressure in the vacuum pressure feedline would be destroyed and it is desired that this feedline be used in common for a number of other heads and other vacuum pressure units.

One way to cut off the vacuum pressure to the surface of the inoperative feedhead would be to energize the solenoid winding of the solenoid valve discussed above. When the solenoid winding is so energized, it acts to hold the solenoid valve so as to cut off the vacuum pressure to the feedhead. However, this would require the continuous energizing of the solenoid winding which would have a tendency to burn out that winding.

The present invention includes a valve means which is independent of the solenoid valve. This independent valve means functions to shut off automatically the vacuum pressure to the surface of the feedhead whenever the feedhead is moved by the cam mechanism to its inoperative position. This obviates any need to energize the winding of the solenoid valve when the feedhead is in its operative position in order to shut off the vacuum pressure to that head.

In brief, therefore, the invention provides improved feeding-stacking dual purpose apparatus for use in data processing systems and the like. When the apparatus of the invention is in its feeding operational mode, a feedhead is cam-actuated to an operative position and a vacuum pressure is controllably produced at the surface of that head to control the feed of cards from the card holder to the associated transporting drum. Alternately, when the apparatus is in its stacking operational mode, the feedhead is cam-actuated to an inoperative position, and the vacuum pressure is automatically discontinued from the surface of the feedhead and independent of the solenoid valve. In addition, a stackhead is pivoted to an operative position by the cam mechanism in proper sequence with the pivotal movement of the feedhead to the inoperative position. By pivoting the stackhead and the feedhead in the proper sequence, a fail-safe operation is provided to prevent cards from becoming lost at any time.

With the apparatus of the invention, the winding of the solenoid valve controlling the vacuum pressure to the feedhead need only by energized briefly, and only when it is desired to transfer a card from the card holder to the associated transporting drum. At all other times, this winding may be deenergized.

In the drawings:

Figure 6 is a sectional view, partially in section, of the apparatus of the invention and is taken substantially on the line 6—6 of Figure 4 and particularly illustrates the driving means for the cam mechanism shown in Figure 5;

Figure 7 is a sectional view substantially on the line 7—7 of Figure 5 and shows how the various cams making up the cam mechanism are mounted on a rotatable cam shaft;

Figure 8 is another view, partially in section, of the driving means for the cam mechanism and is taken substantially on the line 8—8 of Figure 6 and particularly shows a clutch for coupling a drive motor to the cam shaft referred to above and solenoid means for actuating the clutch;

Figure 9 is a view partially in section and is taken substantially on the line 9—9 of Figure 8 to show further details of the clutch mechanism;

Figure 2:
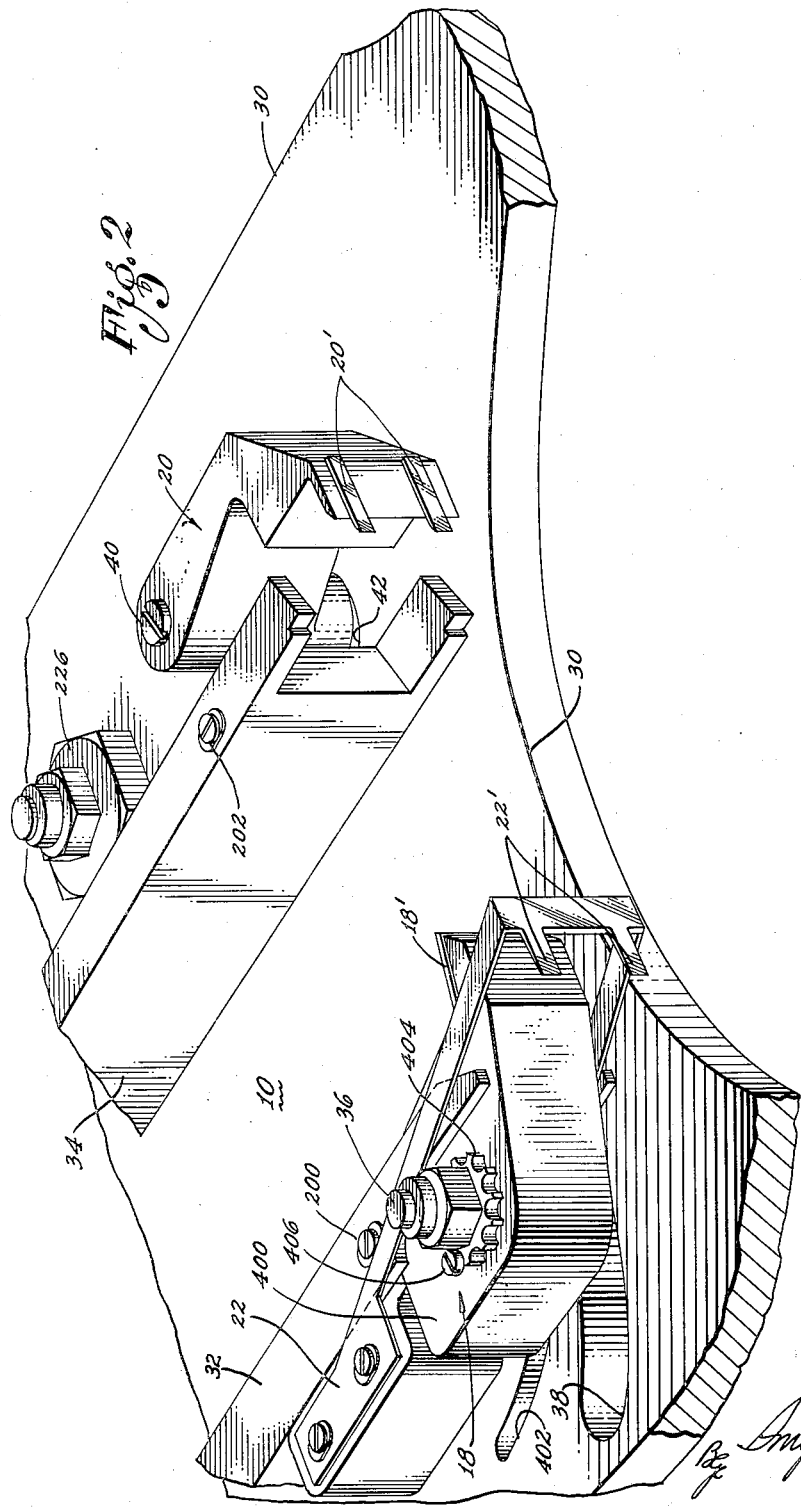
Figure 2 is a perspective view of a reversible feeding-stacking station constructed in accordance with the invention and showing particularly a pivotally mounted feedhead and a pivotally mounted stackhead which are alternately brought into an operating position to condition the station for one operational mode or the other.
Figure 4:
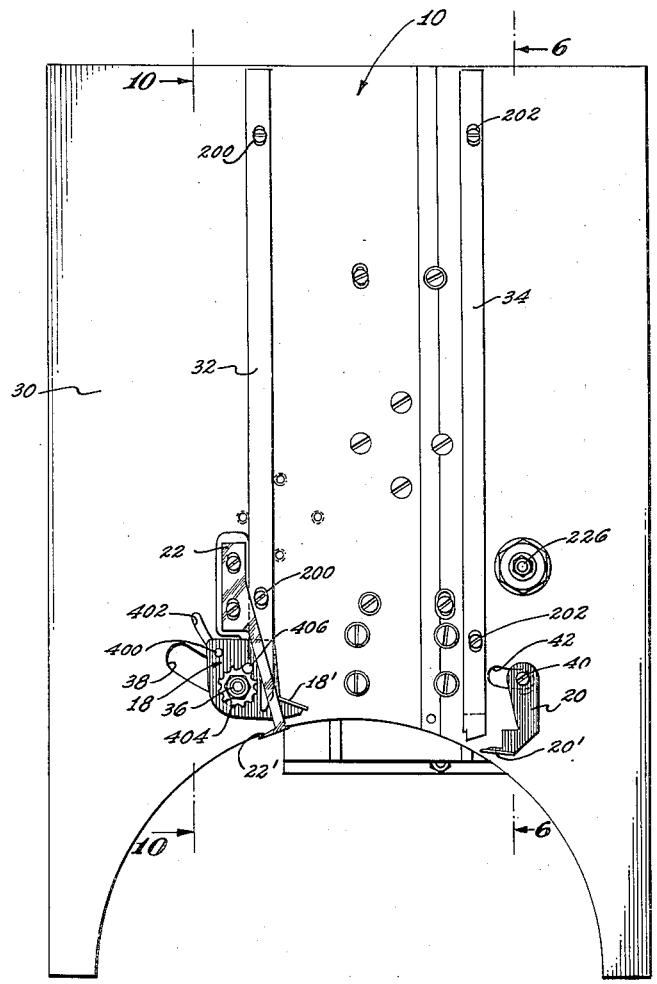
Figure 4 is a detailed top plan view of a reversible feeding-stacking station constructed in accordance with one embodiment of the invention and showing particularly the configuration of the pivotable feedhead and stackhead and the manner in which these heads are supported at the opposite edges of the card holder portion of the reversible station.
Figure 5:
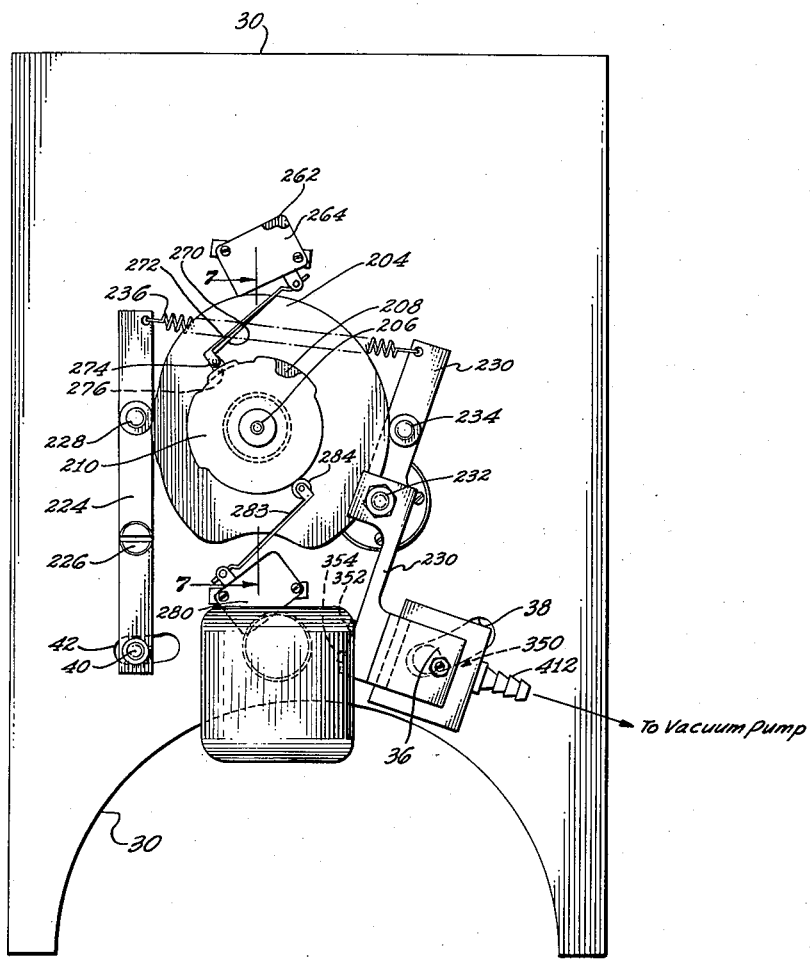
Figure 5 is a bottom plan view of the apparatus of Figure 4 and reveals a rotatable cam mechanism which is incorporated in the apparatus and which actuates the feedhead and the stackhead of Figure 4 to bring the feedhead into an operative position as the stackhead is moved to an inoperative position and vice versa.

Figure 10 also is a view partially in section, and this latter view is taken substantially on the line 10—10 of Figure 4 to show particularly the feedhead assembly and a valve mechanism for controlling a vacuum pressure at the feedhead;

Figure 11 is a sectional view substantially on the line 11—11 of Figure 10 and particularly shows details of the valve assembly which is associated with the feedhead;

Figure 12 is a sectional view of the valve assembly and is taken substantially on the line 12—12 of Figure 11;

Figure 13 is a sectional view of the valve assembly similar to Figure 12 but with the valve assembly in a different operational state;

Figure 14 is a perspective view of the same members shown in Figure 2 as seen from a position similar to that shown in Figure 2 and illustrates the relative disposition of these members in a second operative relationship different from that shown in Figure 2;

Figure 15 is a bottom view of the members shown in Figure 5 and illustrates the relative disposition of these members in a second operative relationship different from that shown in Figure 5;

Figure 16 is a fragmentary view of the reversible feeding-stacking station showing particularly the incorporation of a pair of contacts on the pivotable feedhead, and this view also shows a contact-shorting bar on a member in the station which is adapted to make contact across the contacts when the last card leaves the station;

Figure 17:
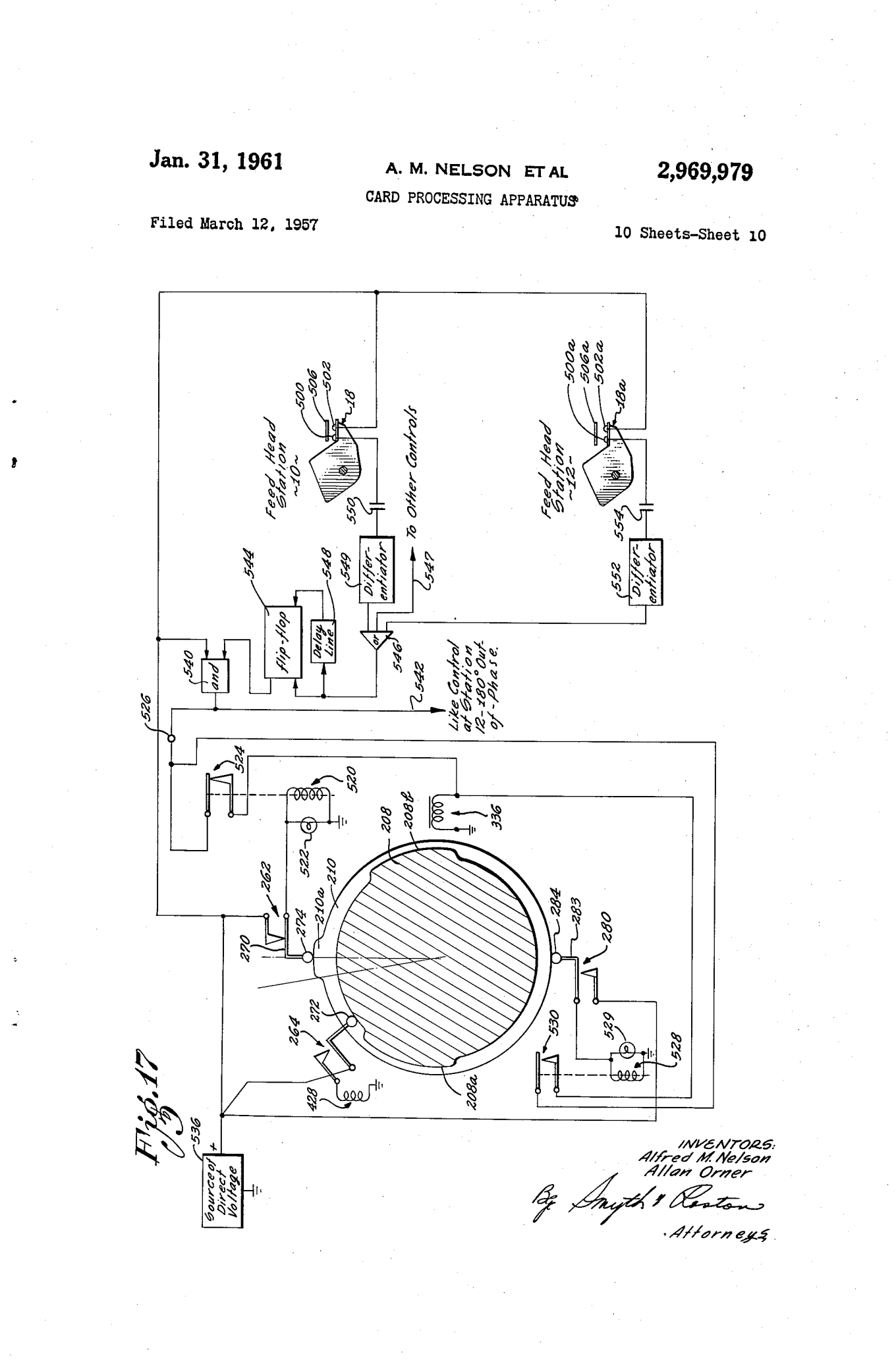

Figure 17 is a control system suitable for operating the reversible feeding-stacking stations of the invention to condition the stations to a feeding state and to a stacking state in a manner to be described; and Figure 18 is a series of curves useful in explaining the control system of Figure 17.

Figure 1:
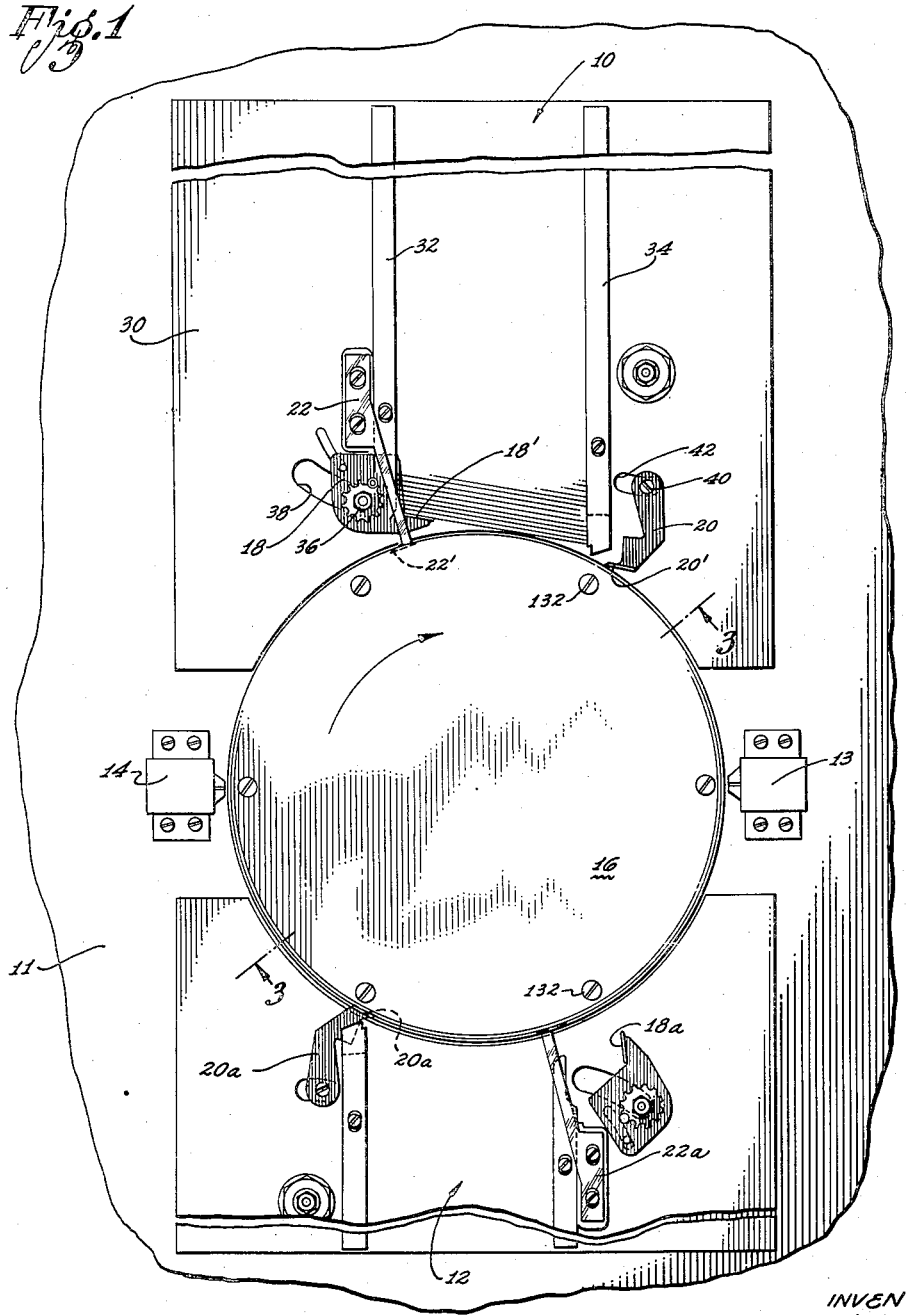
Figure 1 is a top plan view of a simplified data processing system utilizing the apparatus of the invention and illustrating in somewhat schematic form a pair of reversible feeding-stacking stations disposed contiguous to a rotatable drum and adapted to feed information storage cards to and from the drum for processing.

In the system of Figure 1, a rotatable vacuum pressure drum is mounted on a table top 11. The drum is constructed to exert a vacuum pressure at its peripheral edge firmly to retain the information cards on that edge in fixed angular positions so that these cards may be transported by the drum. The construction and operation of the drum will be described in detail subsequently.

A first card holder 10 is mounted on the table top with its mouth in contiguous relationship with the peripheral edge of the drum 16. A second card holder 12 is also mounted on the table top 11 and is positioned diametrically opposite to the card holder 10. The card holder 12 also has its mouth disposed in contiguous relationship to the drum 16. The drum 16 is illustrated as rotating in a clockwise direction.

A first transducer means 13 is mounted on the table top 11 and is positioned between the card holders 10 and 12, and a second transducer means 14 may also be mounted on the table top 11 on the opposite side of the drum 16 from the transducer means 13. The transducer means 13 and 14 may be any suitable and well known type of electromagnetic transducer head, or series of heads. For example, they may be constructed in a manner similar to that described in copending application Serial No. 550,296, filed December 1, 1956, by Alfred M. Nelson et al.

The card holder 10 has a vacuum pressure feedhead 18 pivotally mounted adjacent its leading edge with respect to the direction of rotation of drum 16. This card holder also has a stackhead 20 which is pivotally mounted adjacent its trailing edge with respect to the direction of rotation of the drum 16. The construction and operation of the feedhead 18 and of the stackhead 20 will be described in detail subsequently. It should be pointed out at this time that the head 18 is controlled to exert a vacuum pressure at its surface 18' when it is in its operative position. This vacuum pressure is exerted on the trailing portion of the leading card in the card holder 10. The same leading card rests on the peripheral edge of the drum 16, and the drum also exerts a vacuum force on the card. The stackhead 20 is withdrawn to its inoperative position when the head 18 is in its operative position.

The force exerted by the drum 16 tends to withdraw the leading card from the card holder 10, whereas the force exerted by the head 18 tends to retain that card in the holder. The force of the head 18 is made greater so that it is able to overcome the force exerted on the card by the drum 16. So long as the leading card is held in this manner in the card holder 10, the other cards supported in stacked relationship in the card holder are also held in the holder.

Whenever the vacuum pressure to the feedhead 18 is momentarily interrupted, the leading card in the card holder is withdrawn by the drum 16. The interval of the interruption in the vacuum pressure to the head 18 is usually made sufficiently long so that only one card can be released from the card holder to the periphery of the drum 16. The next card in the stack now comes into position and it is retained in the card holder until the next interruption of the vacuum pressure to the feedhead 18.

In a second operational mode of the apparatus associated with the card holder 10, the feedhead 18 is withdrawn to its inoperative position and its vacuum pressure turned off. The stackhead 20 is simultaneously moved into substantial engagement with the drum 16. The relative positions of the feedhead 18 and the stackhead 20 in the second operational mode may be best seen in Figure 14. When the apparatus is in this operational mode, any card transported by the drum is stopped by the stackhead 20.

A pickoff member 22 is associated with the leading edge of the card holder 10, and this pickoff member has a series of fingers 22' which extend into the peripheral grooves in the drum 16. These fingers are humped radially outwardly so that the cards transported by the drum 16 ride over the fingers and are lifted outwardly from the periphery of the drum. Therefore, a card arrested by the stackhead 20 has its trailing edge projecting over the fingers 22'. The second card transported by the drum 16 rides over the fingers 22' and under the preceding card so as to pry the preceding card from the periphery of the drum. The second card also is stopped by the stackhead 20 and the preceding card is deposited in the card holder 10. In this manner, the apparatus is conditioned so that cards transported by the drum 16 are stacked in the card holder 10.

Therefore, the dual feeding-stacking station described above has two operational modes. In a first mode, cards held in stacked relationship in the card holder 10 may be controllably and successively fed to the peripheral surface of the transport drum 16. In the second operational mode, cards transported by the periphery of the drum 16 are stripped from that periphery and are deposited in the card holder 10.

The card holder 12 may also have a feedhead 18a associated with its leading edge and a stackhead 20a associated with its trailing edge. The card holder 12 may also have a pickoff member 22a mounted adjacent the feedhead 18a. The feedhead 18a and stackhead 20a may be similar in their construction and operation to the corresponding heads 18 and 20 associated with the card holder 10. Likewise, the pickoff member 22a may be similar in its construction to the pickoff member 22.

In one mode of operation, the card holder 10 may contain a plurality of information storage cards in stacked relationship. In that mode of operation, the transfer mechanism associated with the card holder 10 may be conditioned for feeding the cards to the drum 16. The card holder 12 may be empty and its transfer mechanism may be conditioned to deposite cards into the card holder. In this mode of operation, the cards from the card holder 10 may be controllably fed to the transport drum 16 and transported by that drum past the transducer means 13 for processing. After the processing of the cards by the transducer means 13, the cards may be deposited in the card holder 12. At the completion of the processing operation, the operational modes of the apparatus associated with both the card holders 10 and 12 may be reversed so that the cards may be returned in their original order to the card holder 10. The cards may be further processed by the transducer means 14 on their return trip.

The system of Figure 1 is, of course, intended merely to illustrate an operational application of the reversible station of the present invention. The invention itself will find wide utility in most, if not all, vacuum pressure rotatable drum systems and other types of data processing systems for handling information storage cards.

The perspective views of Figures 2 and 14 illustrate the card holder 10 and the associated transfer mechanism in further detail. The card holder 12 and its transfer mechanism may be similarly constructed. The apparatus shown in Figure 2 includes a base plate 30. A pair of spaced and parallel guide rails 32 and 34 are mounted on the base plate 30. These guide rails are spaced a distance corresponding substantially to the length of the information cards. The information cards are stacked in the card holder 10 between these rails in generally vertical planes and with their lower edges resting on the base plate 30. The forward end of the base plate 30 has an arcuate shape so as to embrace an arcuate portion of the periphery of the rotatable drum 16. The rails 32 and 34 extend away from this forward end of the base plate 30.

The feedhead 18 is pivotally mounted adjacent the guide rail 32 on a pivot shaft 36, and the feedhead is movable in an arcuate slot 38 in the base plate 10, as will be described in detail subsequently. The arrangement is such that, when the feedhead 18 is moved to its inoperative position, the feedhead is retracted out of the mouth of the card holder as defined by the guide rails 32 and 34. At the same time, the feedhead is rotated slightly. The position of the feedhead in the retracted and slightly rotated position may be seen from a comparison in Figure 1 of the feedheads in the card holders 10 and 12.

The supporting bracket portion of the pickoff or lifter member 22 defines a rectangular opening through which the feedhead 18 is movable. As previously noted, the pickoff member includes a plurality of humped fingers 22' which are adapted to extend into the peripheral grooves in the drum 16. The forward end of the guide rail 34 is separated by a relatively short distance from the periphery of the drum 16. This distance is slightly greater than the thickness of each card so that only a single card is able to move at any instant past the guide rail 34 whenever the vacuum pressure at the surface 18' of the feedhead is interrupted. The stackhead 20 is pivotable about a pivot shaft 40, and this head is also movable in a slot 42 (see Figures 1 and 4) in the base plate 30.

When the feedhead 18 is in its operative position, the stackhead 20 is withdrawn and the cards are free to pass one at a time past the leading edge of the guide rail 34 and through the throat area described above. However, when the stackhead 20 is moved to its operative position and the feedhead 18 is retracted, the fingers 20' of the stackhead move between the end of the guide rail 34 and into the peripheral grooves in the drum 16. The stackhead then blocks the throat area and causes cards to be deposited in the card holder 10 in the described manner.

The rotatable drum 16 may be constructed in any suitable manner. For example, it may be similar in its construction to the transport drum disclosed and claimed in copending application Serial No. 600,975, which was filed July 30, 1956, by Loren R. Wilson. The details of the transport drum illustrated in Figure 3 are similar to the embodiment of the drum disclosed and claimed in the Wilson application Serial No. 600,975.

Figure 3:
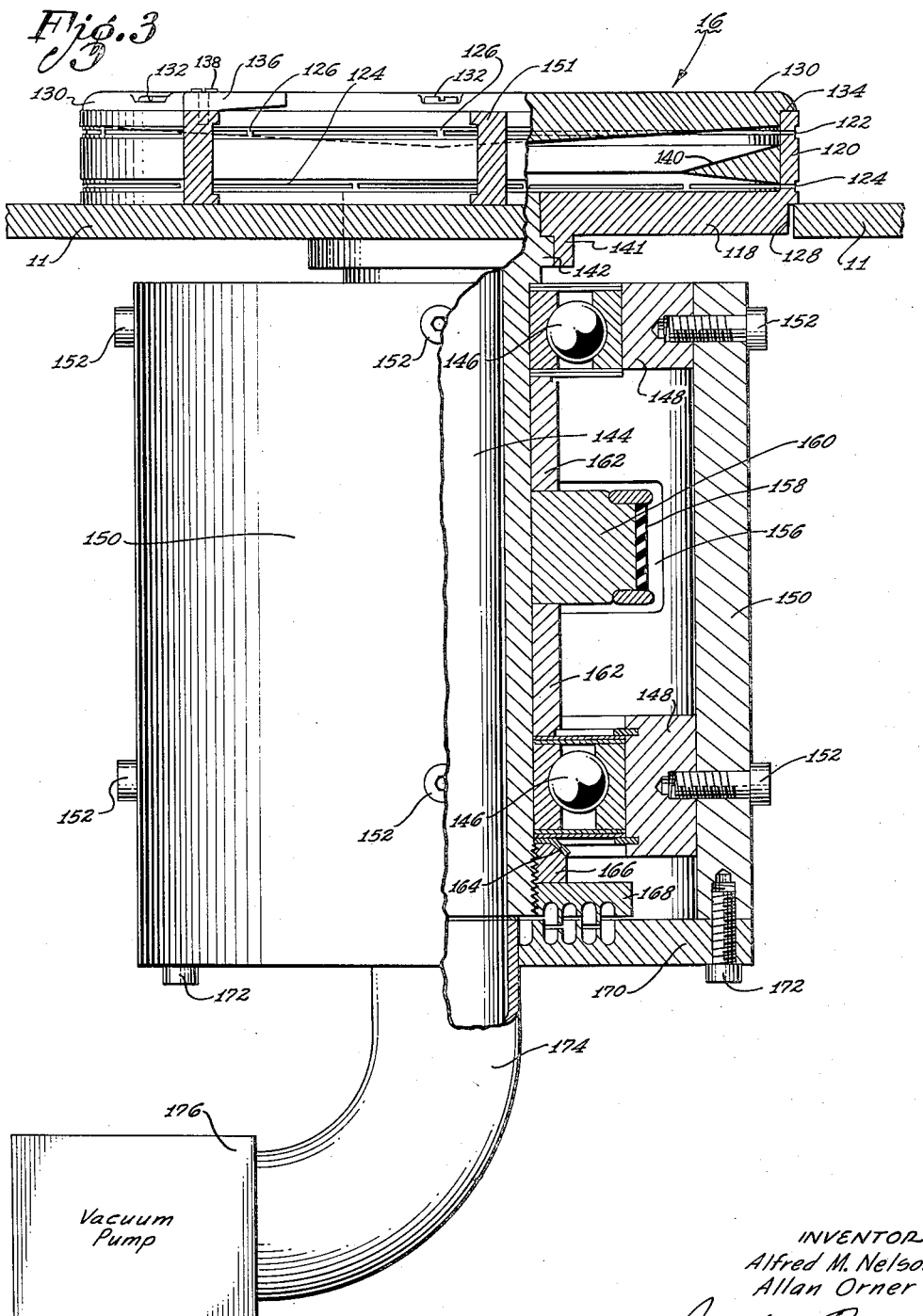
Figure 3 is a sectional view substantially on the line 3—3 of Figure 1 and illustrates the details of the rotatable drum of Figure 1 and the manner in which a vacuum pressure is provided at the periphery of that drum.

As shown in Figure 3, the drum 16 has a lower section and an upper section. The lower section of the drum includes a disk-like bottom portion 118 and an integral annular side portion 120. A pair of axially spaced peripheral orifices 122 and 124 extend through the side portion 120. Each of these orifices has an external groove associated with it for receiving the fingers 22' of the pickoff member 22 and for receiving the fingers 20' of the stackhead 20 in the manner noted above.

The peripheral orifices are discontinuous in that they are interrupted at selected intervals by a series of ribs 126 which are integral with the side portion 120. The integral ribs 126 interrupting the orifice 122, are staggered with respect to the ribs interrupting the orifice 124. This staggering of the ribs is such that the orifices will not weaken the integral characteristics of the side portion 120. The staggering of the ribs 126 also insures that a vacuum pressure will be provided at every angular position around the periphery of the drum 16.

The disk-like bottom portion 118 of the lower section is undercut, as shown at 128. This enables the table top 11 to extend beyond the outer limits of the side portion 120 so that the portion 120 overlaps the table top in the illustrated manner.

The upper section of the drum 16 is in the form of a disk-like member 130 which engages the annular side member 120 of the lower section. The upper section 130 forms an enclosure with the lower section of the drum, with the upper section parallel to the disk-shaped bottom portion 118 of the lower section. The upper section 130 is held in place on the side portion 120 by a series of screws 132. The upper section 130 is also undercut, as shown at 134, for reasons to be described.

When one of the information storage cards is fed from the card holder 10 to the drum 16, it is held by vacuum pressure on the outer peripheral surface of the side portion 120, as will be described. It is essential that the cards be fed to this peripheral surface in an accurately oriented position so that they may be properly processed in the system. The guide rails 32 and 34 of the card holder 10 cooperate with the base plate 30 to direct the cards to the peripheral surface of the portion 120. To assure proper orientation of the cards on the peripheral surface of the portion 120, a guide member 136 may be mounted on the end of the guide rail 34 adjacent the drum 16 as by suitable set screws 138. The guide member 136 may be separated from the periphery of the drum 16 by a distance greater than the thickness of one card so as to provide for a movement of the cards with the drum past the guide member and is disposed to direct the cards downwardly as the cards move with the drum. In order to direct the cards properly in a downward direction, the guide member 136 has a bottom surface which is beveled downwardly. This beveled surface acts to direct the cards downwardly on the periphery of the drum for proper positioning and orientation on that periphery. As will be apparent from the subsequent discussions, proper positioning of the cards on the drum 16 in the vertical direction is important in obtaining a proper positioning of the cards with respect to the transducing means 13 and 14 so that a proper processing of the information on the cards can be obtained.

A deflector ring 140 is supported within the interior of the drum 16 in press fit with the inner surface of the annular side portion 120. This deflector ring is tapered toward the center of the drum to prevent turbulence and to provide a streamlined path for air that is drawn in through the orifices 122 and 124. The undersurface of the upper section 130 is bulged toward the center of the section so as to have a convex shape. This convex shape also cooperates with the deflector ring 140 in providing a smooth path for the air drawn in through the orifices 122 and 124.

The portion 118 of the lower section of the drum 16 has an annular sleeve 141 which extends downwardly from the portion 118. The sleeve 141 fits on a collar 142 provided at one end of a hollow shaft 144 and has a friction fit with the collar. Therefore, rotation of the hollow shaft 144 causes the drum 16 to rotate. Also, the interior of the shaft 144 communicates with the interior of the drum.

Bearings 146 are provided at opposite ends of the shaft 144. The inner races of the bearings 146 are mounted on the shaft 144, and the outer races of the bearings are disposed against bushings 148 secured to a housing 150 as by studs 152. An arcuate opening 156 is provided in the housing 150 between the bearings 146. This opening enables a drive belt 158 to extend into the housing and around a pulley 160. The pulley 160 is affixed to the shaft 144 between the bearings 146 and is held against axial movement by sleeves 162 positioned on the shaft between the bearings and the pulley. In this way, the shaft 144 and the drum 116 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft and is maintained in fixed position on the shaft as by a lockwasher 164. A sealing disk 168 is also screwed on the threaded portion at the bottom of the shaft 144. The sealing disk 168 operates in conjunction with a bottom plate 170 to inhibit the movement of air between the interior of the housing 150 and the interior of the hollow shaft 144 when a difference of pressure exists between the housing and the shaft.

The bottom plate 170 is secured to the housing 150 by a series of studs 172 and is provided with a central opening. A hollow conduit 174 extends into the opening in frictional fit with the plate 170. The conduit 174 is axially aligned with the hollow shaft 144 so that air may be exhausted from the hollow interiors of the shaft and the conduit by a vacuum pump 176. The vacuum pump may be of any suitable known construction and for that reason is shown in block form in Figure 3.

The vacuum pump 176 draws air in through the orifices 122 and 124 and through the interior of the drum 16 down the shaft 144 and through the conduit 174. This creates a vacuum pressure at the outer peripheral surface of the annular portion 120 of the lower section of the drum 16. The deflector ring 140 and the convex underside of the disk-like upper section 130 assures that the air will flow smoothly and with a minimum of turbulence. This assures a high and adequate vacuum pressure around the outer peripheral surface of the annular side portion 120 to firmly retain the cards on that surface.

Detailed constructional features of the reversible apparatus associated with the card holder 10 are shown in Figures 4 to 12, inclusive. As noted previously, the apparatus includes a feedhead 18 which is pivotally mounted on a shaft 36 and which is movable in the slot 38 in the base plate 30. The feedhead 18 moves within the slot 38 which is situated at the leading end of the guide rail 32, and it also moves in and out of the pickoff member or bracket 22.

As best shown in Figure 4, the guide rail 32 is secured to the base plate by a plurality of cap screws 200. The guide rails 34 is mounted on the base plate in spaced parallel relation with the guide rail 32 by means of a plurality of cap screws 202.

The stackhead 20 is pivotally mounted on its actuating shaft 40 for rotation about that shaft and for movement within the slot 42 in the base plate 30. This enables the stackhead to move so that its fingers 20' may, either be retracted from the throat defined by the end of the guide rail 34, or enter and close the throat in the described manner.

As more clearly shown in Figure 5, a cam 204 for the heads 18 and 20 is fixed to a cam shaft 206 to be rotatable on the underside of the base plate 30. A pair of switch actuator cams 208 and 210 are also mounted on the cam shaft 206 in coaxial relation with the cam 204. As best shown in Figure 7, the cams 204, 208 and 210 are keyed to the cam shaft 206 by a Woodruff key 212. These cams are held together by a series of screws such as the screws 214 and they are held on the shaft by a sprocket wheel 222.

The sprocket wheel is rigidly mounted on the end of the shaft by a setscrew 216 (Figure 6). A bearing 218 is supported on the underside of the base plate 30 by a series of screws such as the screws 220 (Figure 7). The bearing 218 is coaxial with the cam shaft 206 and provides a bearing surface for the cam 204. A suitable chain drive is coupled to the sprocket 222 in a manner to be described to produce rotation of the cams 204, 208 and 210.

A lever arm 224 (Figures 5 and 6) is pivotally mounted on the underside of the base plate 30 on a pivot shaft 226. The actuating shaft 40 (Figure 6) for the stackhead 20 extends upwardly from one end of the lever arm 224 through the slot 42 in the base plate 30. A cam follower 228 is rotatably mounted on the lever arm 224 at an intermediate point on the arm between the pivot shaft 226 and the end of the arm remote from the actuating shaft 40. The cam follower 228 is adapted to ride on the peripheral edge of the cam 204.

A second lever arm 230 (Figure 5) is pivotally mounted on a pivot shaft 232 at the other side of the cam 204. The lever arm 230 has a cam follower 234 rotatably mounted at an intermediate point on the arm between the pivot shaft 232 and the upper end of the arm in Figure 5.

A coil spring 236 is coupled between the ends of the lever arms 224 and 230 in Figure 5 and this spring biases the cam followers 228 and 234 against the peripheral edge of the cam 204. The cam 204 is shaped so that in one angular position it moves the lower end of the lever arm 224 in Figure 5 to the left end of the slot 42 in Figure 5 and the lower end of the lever 230 in Figure 5 to the right end of the slot 38 in that figure. In a second angular position of the cam 204, the cam 204 moves the lower end of the lever arm 228 in Figure 5 to the right end of the slot 42 and the lower end of the arm 230 in Figure 5 to the right end of the slot 38 in that figure. The second position of the cam 204 and the lever arms 224 and 230 may be best seen in Figure 15.

The view of Figure 6 clearly shows the lever arm 224, and the pivot shaft 226 for this arm. As shown in this latter figure, the pivot shaft 226 extends through the base plate 30 and is held in place by a nut 250 which is threaded to the end portion of the shaft 226 projecting above the base plate. A pair of washers 252 and 254 are respectively interposed between the nut and the base plate and between the lever arm 224 and the base plate. The lever arm 224 is secured to the shaft 226 by a screw 256 which extends through the shaft, the head of this screw engaging a tubular central portion of the lever arm, and the screw being held in place by a nut 258 and an associated elastic stop nut 260.

A pair of switches 262 and 264 are mounted on the underside of the base plate 30 by means of a mounting bracket 266 (Figure 6). The mounting bracket is secured to the base plate as by a cap screw 268, and the switches are secured to the mounting bracket by a fillister screw 269.

The switches 262 and 264 have respective actuating arms 270 and 272. A pair of cam followers 274 and 276 are respectively rotatably mounted at the respective ends of the arms 270 and 272. The cam followers 274 and 276 are adapted respectively to engage the cams 210 and 208. The arms 270 and 272 are spring biased in a counterclockwise direction to bias the cam followers 274 and 276 against the peripheral edges of the cams 208 and 210. Although the springs biasing the arms 270 and 272 are not shown in the drawings, it is believed that their construction and disposition will be apparent to a person skilled in the art. Detents are disposed around the cams 208 and 210 so that the switches 262 and 264 may be actuated in correspondence with selected angular positions of the cam 204.

A third switch 280 (Figures 5 and 6) is mounted on the underside of the base plate 230 by a mounting bracket 282. This latter switch is positioned on the opposite side of the cam 210 from the switch 262. The switch 280 has an actuating arm 283 which is spring biased to urge a cam follower 284 against the periphery of the cam 210, the cam follower 284 being rotatably mounted at the end of the actuating arm 283.

The switches 262, 264 and 280 are conveniently connected into a control system, which will be described in conjunction with Figure 17.

The sprocket 22 which drives the cam mechanism is coupled to a drive motor 300 in the following manner. The drive motor may be a 23 r.p.m., $\frac{1}{1000}$ horsepower model and is keyed through a coupler 302 (Figure 6) to an over-riding clutch 304. The clutch 304, in turn, is coupled to a sprocket 306. A drive chain 310 couples the sprocket 306 to the sprocket 222. When the clutch 304 is engaged, the motor 300 drives the sprocket 306, which, in turn, drives the sprocket 222 to rotate the cams 204, 208 and 210.

Details of the clutch mechanism are shown in Figures 8 and 9. As more clearly shown in these latter figures, the motor 300 has a drive shaft 312 to which a cylindrical collar 314 is affixed by means, for example, of a stud 316. The collar 314 forms a portion of the coupler 302, and the collar is keyed to a first portion 316 of the clutch 304 by means, for example, of a Woodruff key 317 (Figure 6).

When the clutch is disengaged, the portion 316 of the clutch 304 is freely rotated by the motor 300 and this portion rotates with respect to a second portion 318 of the clutch, the second portion being fixed to a drive shaft 320 on which the sprocket 306 is mounted as by the set screw 322. Rotation of the section 318 of the clutch 304 produces a rotation of the sprocket 306, which, in turn, causes the chain 310 to drive the sprocket 222 of the cam mechanism. Such rotation is realized when the clutch is engaged.

The clutch mechanism is enclosed in a housing 324 (Figure 8) which is mounted on the underside of the base plate 30 by means of a suitable bracket 326. This bracket is appropriately welded to the underside of the base plate and to the housing 324. The housing also serves as a support for the motor 300, the motor being mounted to the end of the housing as by nuts 328 which are threaded to studs from the motor protruding through the end of the housing.

A U-shaped bracket 330 (Figure 8) is mounted on the inside of the housing 324 by means of a pair of cap screws 332 and 334. The bracket 330 is disposed to one side of the clutch 304 and it serves to support a solenoid 336. The solenoid 336 is positioned so that its longitudinal axis extends substantially parallel to the rotational axis of the motor 300 and the clutch 304.

The solenoid 336 has an armature 338 which extends through one end of the U-shaped bracket 330 when the solenoid is not energized. When the solenoid is energized, the armature 338 is retracted against the compression of a spring 340. The solenoid is held in the U-shaped bracket 330 by a screw 342 extending through the other end of the bracket and into the other end of the solenoid.

The clutch 304 is of the over-riding type and it may be of the type commonly referred to as a "Hilliard" clutch. It includes a release bracket 344 which is mounted adjacent the section 318 of the clutch in coaxial relation with the axis of rotation of the clutch. The bracket 344 has a pair of radial ears 349 (Figure 9) positioned diametrically opposite each other. A pair of cap screws 346 and 348 extend from the section 318 of the clutch through slots 351 formed in the release bracket 344.

One ear of the bracket 344 normally engages the end of the solenoid armature 338 protruding through the bracket 330 to hold the clutch 304 in a released condition. This may be best seen in Figure 9. However, when the solenoid is energized to retract the armature 338, the armature releases the bracket 344 such that the section 318 of the clutch is free to be rotated by the section 316 of the clutch. If the solenoid is energized for an extremely short interval, the diametrically opposite ear of the bracket makes only a one-half revolution. This means that the solenoid 336 can be pulsed, and, each time it is so pulsed, the cam mechanism is driven by one-half a complete revolution. The cam 204 can be so shaped that, in a first one-half revolution, the lever 224 (Figure 5) is rotated to bring the stackhead 20 to the operative position and the lever 230 is rotated to bring the feedhead 18 to the inoperative position. These positions of the stackhead 20 and the lever 230 can be best seen in Figures 14 and 15. The next half revolution of the cam can be such as to return the stackhead 20 to the inoperative position and to bring the feedhead 18 to the operative position. These positions of the stackhead 20 and the lever 230 can be seen in Figures 2 and 5.

Therefore, successive pulsing of the solenoid 336 causes the apparatus to have one operational mode or the other. The actual constructional details of the clutches of the type described above are well known to the art. For this reason, it is believed that a more detailed showing and description of the clutch 304 is not necessary.

As most clearly shown in Figures 5 and 10, a valve assembly 350 is supported on the lower end of the lever arm 230 in Figure 5 by means of a plurality of cap screws 352 and 354. The valve assembly 350 is instrumental in supplying vacuum pressure to the surface 18' of the feedhead 18. As previously noted, and as will be described in more detail subsequently, a solenoid valve is included in the valve assembly 350 so that the vacuum pressure at the surface 18' of the feedhead 18 can be periodically interrupted for an interval sufficient to enable a card to be fed from the card holder 10 to the transport drum 16.

When the apparatus is conditioned for stacking, it is desirable that the vacuum pressure to the surface 18' of the feedhead be shut off. This is required, as pointed out above, so that the vacuum feedline can be used in common with other associated apparatus and without vacuum being lost through the feedhead 18. As also noted above, one manner of accomplishing this is to maintain the solenoid in the valve assembly 350 continually energized when the feedhead 18 is in its inoperative position. However, this would tend to burn out the energizing winding of the solenoid. In accordance with the present invention, whenever the feedhead 18 is retracted to the back of the slot 38 (Figure 4) and into its inoperative position, mechanical means functions to interrupt the vacuum pressure to the head and to close the associated feedline. This is accomplished mechanically so that there is no need to maintain the solenoid valve continually energized. The arrangement is such that, whenever the feedhead 18 is retracted to its inoperative position, an internal valve closes to shut off the vacuum pressure, and, when the feedhead is returned to its operative position, this internal valve opens to restore the vacuum pressure to the surface 18'.

As shown, for example, in Figures 4, 11, 12 and 13, the feedhead 18 is rotatably mounted on the pivot shaft 36 and it has a stud 400 which extends into a slot 402 in the base plate 30. The slot 402 is shaped and positioned so that, as the pivot shaft 36 is retracted in the slot 38, the stud 400 moves in the slot 402 to rotate the feedhead 18 with respect to the pivot shaft.

A detent wheel 404 is rotatably mounted on the pivot shaft 36 and is mechanically coupled to a portion of the valve assembly 350, as will be described in detail. A cap screw 406 is threaded into the feedhead 18 and engages a detent in the wheel 404. Then, as the assembly is moved, the rotation of the feedhead 18 with respect to the shaft 36 causes the detent wheel 404 to rotate on that shaft. This may be seen from a comparison of the positioning of the cap screw 406 in Figures 2 and 11.

As shown in Figure 11, the valve assembly includes a valve body 410 having a nipple 412 attached to one side. This nipple forms a convenient means to couple the valve to an air line leading to an appropriate vacuum pump (not shown). A conduit 414 within the valve body communicates with the nipple 412 at one end and communicates with a vertical passageway 416 at its other end. The vertical passageway 416 communicates with a larger passageway 418 that extends to the bottom of the valve body 410. A valve guide 415 is mounted in the larger passageway as by screws 420, and a valve 422 has its stem extending through the valve guide 415 and the valve seats on the upper end of the valve guide.

A coil spring 424 is positioned in the passageway 416. This spring biases the valve 422 downwardly and seats it firmly on the end of the guide 415.

A bracket 426 is mounted on one side of the valve body 410, and this bracket serves to support a solenoid 428 under the valve body. The solenoid 428 has an armature 430 which is in axial alignment with the stem of the valve 422. The armature 430 is constructed so that its magnetizable end extends below the solenoid and so that its upper portion is not magnetizable. Because of this construction, the armature 430 is attracted upwardly when the solenoid 428 is energized. The upward movement of the armature 430 causes the valve 422 to move upwardly against the biasing action of the spring 416 so as to seat the valve against the top of the passageway 418.

An L-shaped bracket 431 is secured to the bracket 426 as by a cap screw 432. The bottom portion of the bracket 431 extends under the solenoid, and a cap screw 434 is threaded through that bottom portion in axial alignment with the stem of the valve 422. The screw 434 has a nut 436 disposed just under the bracket 431 and it has a head 438. Adjustment of the screw 434 bodily moves the solenoid 428 and the valve 422 upwardly or downwardly to control the positioning of the valve in the valve body.

A lateral passageway 440 in the valve body couples the passageway 418 to a second vertical passageway 442. It should be evident at this point that, when the solenoid 428 is not energized, the spring 416 biases the valve 422 downwardly to open the passageway 440 and creates a vacuum pressure at the top of the passageway 442. However, when the solenoid 428 is energized, the valve 422 moves upwardly against the spring 424 to seat against the bottom of the passageway 416 and to interrupt the vacuum pressure from the conduit 414 and nipple 412. This movement of the valve also opens the passageway 440 to the atmosphere through a vertical passageway 425, the top of the latter passage being opened by this movement of the valve. This relieves the vacuum pressure at the top of the passageway 442.

The pivot shaft 36 referred to previously is a hollow shaft and it has a lower end portion that extends into the valve body 410. A passageway 444 extends upwardly through the shaft 36 in axial alignment with the passageway 442. A pair of ports 446 and 448 is formed in the sides of the shaft 36 diametrically opposite one another and in communication with the passageway 444 in that shaft.

A valve guide 450 is mounted on the top of the valve body 410 and surrounds the shaft 36. A ring 452 is introduced between the shaft 36 and the valve guide 450 to function as a bearing surface and a seal. The valve guide 450 extends through the slot 38 in the base plate 30 and moves in that slot. The valve guide 450 also extends into a passageway 460 in the lower portion of the feedhead 18, and a ring 462 is disposed between the valve guide 450 and the feedhead to function as a bearing surface and as a seal. A further ring 461 is mounted in a socket near the top of the feedhead 18 and is adapted to function as a seal between the shaft 36 and the feedhead 18.

The valve guide 450 has a pair of diametrically positioned chambers 466 and 467 (Figures 12 and 13) adjacent respective ones of the ports 446 and 448 in the shaft 36. The chambers 466 and 467 of the valve guide 450 communicate with the passageway 460 in the feedhead 18, which passageway is coaxial with the shaft 36. A radial passageway 470 couples the passageway 460 to a chamber 480 (Figures 12 and 13) in the feedhead adjacent the surface 18' of the feedhead. The surface 18' has a series of orifices such as the orifice 481 extending into the chamber 480.

When the feedhead 18 is moved between its operative and its inoperative position, the stud 400 causes it to rotate with respect to the valve guide 450 which is moving in the slot 38. This rotation of the feedhead is transmitted by the screw 406 to the detent wheel 404. The detent wheel is affixed to the hollow shaft 36 so that the hollow shaft also is made to rotate with respect to the valve guide 450.

As best shown in Figure 12, when the assembly is moved to its operative position, the relative positions of the shaft 36 and the valve guide 450 are such that the ports 446 and 448 communicate respectively with the chambers 466 and 467 so that vacuum pressure may be produced at the surface 18' of the feedhead 18. This vacuum pressure is under the control of the solenoid 428 and is interrupted whenever the solenoid is energized to move the valve 422 upwardly so as to block the passageway 440.

Now, when the assembly is moved to its inoperative position of Figure 13, the members 36 and 450 assume relative positions, as shown in Figure 13. In these latter relative positions, the ports 446 and 448 do not communicate with the chambers 466 and 467. Therefore, the path to the surface 18' of the feedhead 18 is shut off. Then, even though the solenoid 428 is not energized, no vacuum pressure is established at the surface 18' and the vacuum pressure feedline is closed.

Therefore, as the last card leaves the card holder 10 and the apparatus is moved from its feeding mode to its stacking mode, the vacuum pressure to the feedhead 18 is cut off by mechanically closing a valve in the assembly associated with that head. Therefore, without the need for energizing the solenoid 428, the vacuum line is effectively closed so that it can be used to establish vacuum pressure at another point in the system without losses occurring at the feedhead 18.

As best shown in Figure 16, the surface 18' of the feedhead 18 may be provided with a pair of electrical contacts 500 and 502. Each of these contacts may be in the form of an electrically conductive stud extending a short distance outwardly from the surface 18'. The electrical contacts are mounted in the feedhead 18 in spaced insulating relation and appropriate individual connections are made to each of these contacts.

A pusher member 504 is included in the reversible station, and this member is adapted to slide between the guide rails 32 and 34 backwardly and forwardly, under, for example, the action of means such as a spring which exerts a constant force. Although the spring is not shown in the drawings, the construction and operation of a spring and of a pusher member corresponding to the member 504 are fully shown in co-pending application Serial No. 641,752, filed February 21, 1957, by Alfred M. Nelson et al. The purpose of the member 504 is to hold the cards in the station in a rigidly stacked condition.

The member 504 is provided with an electrically conductive resilient contact arm 506. This contact arm is secured to the member 504, for example, by means of a pair of screws 508 and 510. The resilient contact arm 506 extends outwardly from the member 504 and is adapted to extend across the face 18' of the feedhead 18 when the last card leaves the station under conditions when the station is in a feeding condition.

The contact arm 506 has a dimpled end portion 506' which axially engages the surface 18' and extends across the contacts 500 and 502 to complete an electrical connection between these contacts.

Therefore, when the station of Figure 16 is in a feeding condition and when a series of cards in the station are being fed in a one-by-one sequence to the periphery of the drum 16, the contacts 500 and 502 are normally open circuited with respect to one another. During the transfer of cards from the station to the periphery of the drum, the member 504 is biased forwardly so that it continually approaches the feedhead 18. When the last card leaves the station, the portion 506' of the contact arm 506 extends across the contacts 500 and 502 to short circuit these contacts. This indicates that the station is now empty and causes appropriate controls to be initiated which will be described.

The control system of Figure 17 shows schematically the switch actuator cams 208 and 210 which have been previously discussed, and also shows in schematic form the switches 262, 264 and 280 associated with these cams. It will be seen from Figure 17 that the cam 210 has a raised portion 210a which actuates the cam follower 274 of the switch 262 and the cam follower 284 of the switch 280. The switch 262 is actuated by the cam follower 274 and is closed by the portion 210a for a particular angular position of the cam 210, and the switch 262 is held closed for an angular increment of the cam 210 of, for example, 40°. The switch 280, on the other hand, is closed when the portion 210a is displaced 180° from its position in which the cam follower 274 is actuated. Therefore, for a first position of the cam 210 corresponding, for example, to 0°, the switch 262 is closed. After a half revolution of the cam 210, the raised portion 210a of the cam reaches a second position displaced 180° from the first position. In its second position, the raised portion 210a is instrumental in closing the switch 280.

The cam 208 has two raised portions 208a and 208b which are separated from each other by an angular distance of, for example, 180°, and which each extend for an angular distance of 60°. These portions 208a and 208b actuate the cam follower 272 to close the switch 264 for corresponding portions of the angular travel of the cam 208.

The armature of the switch 262 is connected to one side of the energizing winding of a relay 520. The other side of this relay winding is grounded, and the winding may be shunted by an indicator lamp 522. The relay 520 includes a normally open relay switch 524. The fixed contact of the relay switch 524 is connected to one side of the energizing winding of the solenoid 336, the other side of this winding being grounded. It will be remembered that the solenoid 336, as shown in Figures 8 and 9 and as previously described, when energized for a brief instance will allow the clutch 304 to release and enable the motor 300 to drive the cams 204, 208, and 210 through 180°. The armature of the relay switch 524 is connected to the input terminal 526 of the control system.

The armature of the switch 280 is connected to one side of the energizing winding of a relay 528. The other side of this winding is connected to ground, and the winding is shunted by an indicator lamp 529. The relay 528 includes a normally open relay switch 530. The fixed contact of the switch 530 is connected to the ungrounded side of the energizing winding of the solenoid 336. The armature of the switch 530 is connected to the input terminal 526.

The fixed contact of the switch 280, together with the fixed contact of the switch 262 and the armature of the switch 264, are connected to the positive terminal of a source of direct voltage 536. The fixed contact of the switch 264 is connected to one side of the energizing winding of the solenoid 428. The other side of this winding is grounded. It will be remembered that the solenoid 428 controls the vacuum pressure at the surface 18' of the feedhead 18, and that the vacuum pressure is removed from that surface when this winding is energized.

The portion of the control system described above may, for example, be incorporated at the card holder 10. A similar control system may be included at the card holder 12, and a connection may be made to the latter control system over a lead 542. It should be noted that the switch actuator cams 208 and 210 at the card holder 12 must be displaced 180° with respect to the cams at the card holder 10. This is in order that the two holders may operate in a complementary manner, with one feeding when the other is stacking, and vice versa.

"And" networks such as the network 540 are well known to the electronic computer art. These networks become conditioned for translation only when all of a plurality of input signals are applied to the input terminals of the network. Such networks are described, for example, on page 32 of "Arithmetic Operations in Digital Computers," by R. K. Richards (published by D. Van Nostrand of Princeton, New Jersey, in 1955).

One of the input terminals of the "and" network 540 is connected to the positive terminal of the source of direct voltage 536. The other input terminal of the "and" network 540 is connected to the left output terminal of a flip-flop 544. The output terminal of the "and" network 540 is connected to the terminal 526 and to the lead 542.

Flip-flops are well known to the computer and electrical arts in general and need not be described in detail here. These flip-flops are bi-stable trigger circuits and respond to input signals applied to their left or right input terminals to assume one or the other of two stable operative conditions. For example, when a negative pulse is applied to the left input terminal of the flip-flop, a relatively high voltage appears at its left output terminal and the flip-flop is said to be in its "true" state. On the other hand, when a negative pulse is introduced to its right input terminal, the flip-flop is triggered to its "false" state and a relatively high voltage appears at its right output terminal. The presence of a relatively high voltage at either one of the output terminals of the flip-flop is accompanied by a relatively low voltage at the other output terminal.

The output terminal of an "or" network 546 is connected to the left input terminal of the flip-flop 544. A delay line 548 of any suitable construction connects the output terminal of the "or" network 546 to the right input terminal of the flip-flop.

"Or" networks are also well known to the electronic art. These networks are also described on page 32 of "Arithmetic Operations in Digital Computers," by R. K. Richards referred to above. These networks function to translate any one of a plurality of input signals applied to its input terminal.

A differentiator 549 has its output terminal connected to one input terminal of the "or" network 546, and the differentiator has its input terminal connected to one terminal of a capacitor 550. The capacitor, in turn, is connected to the fixed contact 500 described in conjunction with Figure 16 as on the feedhead 18 at the holder 10, and the contact 502 on the feedhead is connected to the positive terminal of the source 536.

A differentiator 552 is connected to a second input terminal of the "or" network 546. A capacitor 554 is connected between the input terminal of the differentiator 552 and a contact 500a corresponding to the contact 500 but on the feedhead 18a at the holder 12. The contact 502a on the feedhead 18a (which corresponds to the contact 402 on the feedhead 18) is connected to the positive terminal of the source 536. Other appropriate controls which will be described are connected by a lead 547 to a third input terminal of the "or" network 546.

It should be appreciated that the electrical circuitry shown in Figure 17 is included only by way of example and that other circuitry may also be used. For example, the capacitance 554 and the differentiator 552 may be replaced by relay means, as may the capacitance 550 and the differentiator 549. Relay means may also be included to be responsive to the signals passing through the "and" network 540 and to control the operation of such other members as the solenoid 336.

In explaining the operation of the holders 10 and 12, it will be assumed that in the illustrated system of Figure 17, the holder 10 is in a feeding condition and the holder 12 is in a stacking condition. As shown in Figure 17, the switch 270 is held closed for this condition and the relay winding 520 and its indicator lamp 522 are energized. This causes the relay switch 524 to be closed so that a circuit from the input terminal 526 to the clutch actuating solenoid winding 336 is prepared.

During this operating condition, the switch contacts 500 and 502 and the switch contacts 500a and 502a are open as long as there are cards in both the holders. However, when the last card leaves the holder 10, the connecting arm 506 connects the contact 500 to the contact 502 in the manner described above. This in turn connects the capacitor 550 to the positive terminal of the source 536 so that a surge of current flows into the capacitor. This produces a current pulse which is differentiated and sharpened in the differentiator 549 and applied to the left input terminal of the flip-flop 544 through the "or" network 546.

The flip-flop 544 is triggered by the pulse from the differentiator 549 into its "true" state in which a relatively high voltage appears at its left output terminal. This relatively high voltage prepares the "and" network 540 for translation so that the positive voltage of the positive terminal of the source 536 appears at the output terminal of the "and" network. This voltage is therefore introduced to the input terminal 526 and through the prepared circuit of the closed relay switch 524 to the clutch actuating solenoid 336. The delay line 548 returns the flip-flop 544 to its "false" state a short time thereafter effectively to remove the voltage from the clutch actuating solenoid winding 336. This control is such that the winding 336 is energized just long enough to release the clutch and cause the cams to move 180° in the described manner.

The cam 204 and the switch actuator cams 208 and 210 are now rotated through 180° in a counterclockwise direction. This action is assumed to occur at the end of the first cycle in Figure 18 so as to initiate the second cycle. As the cam 210 turns, the portion 210a moves out of engagement with the cam follower 274 so that the switch 262 opens. This deenergizes the relay winding 520 and opens the conditioning circuit through the relay switch 524 from the input terminal 526 to the energizing winding of the clutch actuating solenoid 336.

After a rotation through a suitable angular distance such as approximately 30°, as represented in Figure 18, the cam 204 begins to bring the stackhead 20 of the holder 10 into its operating position. The rise on the cam 204 extends for 50 angular degrees so that the stackhead is brought completely into position after 80° of rotation. It is important to note that at this point in the cycle both the stackhead 20 and the feedhead 18 are in position.

After rotation through a suitable angular distance such as approximately 90°, the portion 208b of the cam 208 engages the cam follower 272 to close the switch 264. This causes the vacuum pressure at the surface 18' of the feedhead 18 to be turned off. After rotation through a suitable angular distance such as approximately 100°, the feedhead 18 begins to move back to its standby position. During this motion, the mechanical valve in the feedhead closes the surface 18 to the vacuum pressure line and also bleeds that surface to the atmosphere, as described in detail previously. The feedhead 18 is moved fully to its standby position at 150° of rotation of the cam 204 and, at this position, the mechanical valve is completely turned off. At this instant, and because the solenoid 428 is no longer needed, the portion 208b of the switch actuator cam 208 moves out of engagement with the cam follower 272 so that the switch 264 becomes opened. This deenergizes the solenoid 428 and allows vacuum pressure to be resumed through the solenoid valve. However, this vacuum pressure is arrested by the mechanical valve as previously stated. Therefore, there is no need to energize the solenoid 428 continually merely to prevent vacuum pressure from existing at the surface 18' of the feedhead 18.

After a suitable angular rotation such as approximately 160°, the portion 210a of the switch actuator cam 210 engages the cam follower 284. This causes the switch 280 to close and the relay winding 528 and its indicator lamp 529 to be energized. When the relay winding 528 is energized, the relay switch 530 is closed to prepare a circuit from the input terminal 526 to the energizing winding of the clutch actuating solenoid 336. The system is now arrested until the solenoid 336 is again energized. The holder 10 is now conditioned to function in a stacking mode.

At the same time that this control is taking place in the holder 10, the lead 542 may cause a similar 180° displaced control to be taking place at the card holder 12. That is, the card holder 12 may be simultaneously controlled to change from its stacking to its feeding condition. An appropriate delay may be incorporated in the lead 542 or in the connection between the differentiator 549 and the "or" network 546 to permit the last card from the card holder 10 to reach the card holder 12 before the changeover is made.

Then, as the last card leaves the card holder 12 in the next cycle, the switch contact 506a closes the contacts 500a and 502a to reinitiate the operations described above and to condition the card holder 12 to return to its stacking condition and the card holder 10 to its feeding condition. An appropriate delay line may be incorporated between the differentiator 552 and the "or" network 546 to permit the last card to return to the card holder 10 before this control is made.

By means of the control system described above, the card holders 10 and 12 may be automatically operated to feed cards back and forth between these two holders. The changeover may occur each time that the particular feeding holding becomes empty. It is clear that either one or the other or both of the holders may be independently changed over at any time by an appropriate control pulse on the lead 547 connected to the "or" network 546. Such a control pulse may be made to changeover the holders before the feeding holder is emptied. The system is so controlled that this may be done without affecting or mutilating cards remaining in the feeding holder while the changeover is taking place.

When the card holder 10 is changed from a feeding holder to a stacking holder while it is still in the process of feeding cards to the peripheral surface of the drum 16, the sequence of changeover operations as described above are such that first the stackhead 20 moves into position to stop any further transfer of the cards from the holder to the drum. The fingers 20' of the stackhead move under the leading card, gently but firmly stop the transfer of the card and strip it from the periphery of the drum. This card and the others behind it are therefore held from further transfer to the drum. Then, the vacuum pressure at the surface 18' of the feedhead 18 is terminated so that there is no tendency for the feedhead to draw cards with it as it is moved back to its standby position. After the feedhead has been so moved to its standby position, its mechanical switch closes the vacuum pressure so that the solenoid switch may be deenergized as described above.

Alternately, if the card holder 10 is in a stacking condition, it may be appropriately changed to a feeding condition even though cards are in the holder by a pulse on the lead 547. The sequence of operations is such that the feedhead 18 is first moved into position during such a transformation. The trailing edge of the leading card in the holder is projecting over the fingers 22' of the lifter 22 as described above. The feedhead 18 moves under this trailing edge of the leading card to bring its surface 18' under the leading card. Therefore, the leading card and the others in the holder are brought into a proper feeding inclination by the feedhead 18 and rest against the leading card on the surface 18' of the feedhead. Then the vacuum pressure is established at the surface 18' of the feedhead and finally the stackhead 20 is moved back to its standby position.

The invention provides, therefore, system and apparatus including an improved reversible feeding and stacking holder. The holder comprises apparatus that may be conveniently controlled either to remove cards from an associated vacuum pressure transporting drum and deposite such cards in a stacked condition in a card holder, or, alternately, to controllably feed cards from the card holder in a one-by-one sequence to the associated vacuum drum. The apparatus of the invention is so constructed that the holder may appropriately be controlled automatically to change its condition from feeding to stacking as the last card leaves the holder. Alternately, the holder may be controlled at any time to change its condition, and this is done without losing or mutilating any of the cards remaining in the holder. All these control operations may be carried out without the need to interrupt the vacuum pressure to the card holders or to the transporting drums.

The apparatus is inherently foolproof in its operation, and any of the various controls may fail without adversely affecting the system or damaging the cards. For example, should vacuum pressure be lost while the holder is in a stacking condition, there is no noticeable effect because of the mechanical valve closing the vacuum pressure to the feedhead surface 18'. Likewise, should electrical control of the solenoid valve controlling this vacuum pressure be lost during this condition there is no noticeable result. Should any of the electronic controls be lost to the card holder, while it is in a feeding condition, it merely continues to feed cards to the drum in a one-by-one sequence until the card holder is empty.

The card holder of the present invention, therefore, represents a practical unit that has wide commercial application. As is evident from the description, the unit not only functions adequately to perform its intended purpose but also is rugged in its construction and foolproof in its operation. It should be appreciated that the term "transport means" as used in the claims is intended to include drums as well as other types of conveyors for the cards. It should also be appreciated that the term "cards" as used in the specification is intended to include any type of discrete elements capable of storing a plurality of bits of information and subsequently having such bits of information reproduced.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In a system for processing data on a plurality of information storage cards as represented by signal indications on the cards, which system includes transport means for the cards, the combination of, a card holder for maintaining such cards in stacked relationship and disposed relative to the transport means to provide a transfer of cards between the card holder and the transport means, a feedhead pivotable to an operative position coupling the head to the cards in the card holder and disposed in the operative position relative to the transport means and the card holder to obtain a controlled transfer of cards from the card holder to the transport means and pivotable to a stand-by position decoupling the feedhead from the cards in the card holder, a stackhead pivotable to an operative position coupling the head to the cards on the transport means and disposed in the operative position relative to the transport means and to the card holder to obtain a controlled transfer of cards from the transport means into the card holder and pivotable to a stand-by position decoupling the stackhead from the cards in the card holder to prevent a transfer of cards from the transport means, and control means operatively coupled to the feedhead and the stackhead for pivotally moving said feedhead to the operative position and concurrently for pivotally moving said stackhead to the stand-by position at particular times and for pivotally moving said feedhead to the stand-by position and concurrently for pivotally moving said stackhead to the operative position at other times.

2. In a system for processing data on a plurality of information storage cards as represented by signal indications on the cards, the combination of, transport means for the cards, a card holder for maintaining such cards in stacked relationship and positioned relative to the transport means and provided with an opening for obtaining a passage of cards between the card holder and the transport means, a feedhead movable in an arcuate path to an operative position coupling the head to the cards in the card holder to obtain a controlled transfer of the cards from the card holder to the transport means and movable in an arcuate path to a stand-by position decoupling the head from the cards in the card holder, a stackhead movable in an arcuate path to an operative position coupling the head to the cards on the transport means to obtain a controlled transfer of the cards from the transport means to the card holder and movable in an arcuate path to a stand-by position decoupling the head from the cards on the transport means to prevent any such transfer, and control means including electrical circuitry operatively coupled to the feedhead and to the stackhead for obtaining a synchronized movement of the feedhead to the operative position and the stackhead to the stand-by position at particular times in the arcuate paths and for obtaining a synchronized movement of the feedhead to the stand-by position and the stackhead to the operative position at other times in the arcuate paths.

3. In a system for processing data on a plurality of information storage cards as represented by signal indications on the cards, which system includes transport means for the cards, the combination of, a card holder for maintaining such cards in stacked relationship and provided with an opening and disposed in co-operative relationship with the transport means for providing a transfer of cards between the card holder and the transport means and through the opening, a feedhead movable to a position operative on the cards in the card holder to obtain a transfer of the cards from the card holder to the transport means and movable to a stand-by position out of operative relationship with the cards in the card holder, means coupled to the feedhead in the operative position of the feedhead for providing a passage of fluid through the feedhead to obtain a controlled transfer of cards from the card holder to the transport means, means operative on the feedhead in the stand-by position of the feedhead for preventing the passage of fluid through the feedhead, a stackhead movable to a position operative on the cards being transported to obtain a transfer of the cards from the transport means into the card holder and movable to a stand-by position out of operative relationship with the cards being transported, and control means operative upon the feedhead and the stackhead for moving the feedhead to the operative position and concurrently moving the stackhead to the stand-by position at particular times and for moving the feedhead to the stand-by position and concurrently moving the stackhead to the operative position at other times.

4. In a system for processing data on a plurality of information storage cards as represented by signal indications on the cards, such system including transport means for the cards, the combination of, a card holder for maintaining the cards in stacked relationship and provided with an opening and disposed relative to the transport means to provide a transfer of cards between the card holder and the transport means and through the opening, a feedhead movable to a position operatively coupled to the cards in the card holder to obtain a transfer of cards from the card holder to the transport means and movable to a stand-by position out of coupled relationship with the cards in the card holder, and means operatively coupled to the feedhead for providing a passage of fluid through the feedhead in the operative position of the feedhead to retard the transfer of cards from the card holder until the interruption in the flow of fluid, means operative on the feedhead in the operative position of the feedhead for interrupting any flow of fluid through the feedhead at particular times to obtain a transfer of cards from the card holder to the transport means at such times, and means operative on the feedhead in the stand-by position of the feedhead to prevent any flow of fluid through the feedhead.

5. In a system for processing data on a plurality of information storage cards as represented by signal indications on the cards, which system includes a rotatable drum having a vacuum pressure at the periphery of the drum for transferring cards to the periphery of the drum and for retaining cards in fixed position on the periphery of the drum, the combination of, a card holder for maintaining such cards in stacked relationship, the card holder being disposed in contiguous relationship to the drum for a transfer of cards from the holder to the drum, a feedhead pivotable to an operative position relative to the cards in the card holder to provide for a transfer of cards from the card holder to the drum and pivotable to a stand-by position relative to the cards in the card holder to prevent such a transfer, and means coupled to the feedhead in the operative position of the feedhead for introducing a vacuum pressure to the feedhead to impose a force on the cards for preventing the transfer of the cards from the card holder and for interrupting the vacuum pressure in the feedhead at particular times to obtain a transfer of cards to the periphery of the drum from the card holder, and means operative on the feedhead in the stand-by position of the feedhead for preventing any introduction of vacuum pressure to the feedhead.

6. In a system for processing data on a plurality of information storage cards as represented by signal indications on the cards, the combination of, a rotatable vacuum pressure transporting drum for the cards, means including a vacuum pressure feedhead movable to a position providing an operative relationship with the cards in the card holder for obtaining a controlled introduction of the vacuum pressure to the feedhead for a retention of the cards against transfer to the drum and movable to a stand-by position preventing any operative relationship with the cards in the card holder, means coupled to the feedhead in the operative position of the feedhead for providing a controlled interruption in the vacuum pressure introduced to the feedhead to obtain a removal of the cards by the drum from the card holder, a stackhead movable to a position providing an operative relationship with the cards on the transport drum for obtaining the removal of the cards from the drum for the transfer of such cards to the card holder and movable to a stand-by position preventing any operative relationship with the cards on the transport drum, and control means including electrical circuitry and coupled to the feedhead and to the stackhead for obtaining a movement of the feedhead to the operative position and for obtaining a concurrent movement of the stackhead to the stand-by position at particular times and for obtaining a movement of the feedhead to the stand-by position and a concurrent movement of the stackhead to the operative position at other times.

7. In a system for processing data on a plurality of information storage cards as represented by signal indications on the cards, the system including a card holder for holding the cards in stacked relationship and provided with an opening and including transport means for the cards, the transport means being disposed in contiguous relationship to the cards in the card holder to obtain a transfer of cards between the card holder and the transport means and through the opening, the combination of, a feedhead disposed at one end of the opening in the card holder and provided with a finger and pivotable to an operative position to provide a coupling between the finger and the cards in the card holder for a controlled transfer of cards from the card holder and pivotable to a stand-by position preventing any coupling between the finger and the cards in the card holder, a stackhead disposed at the opposite end of the opening in the card holder and provided with a finger and pivotable to an operative position to provide a coupling between the finger and the cards on the transport means for a controlled transfer of cards into the card holder from the transport means and pivotable to a stand-by position preventing any coupling between the finger on the stackhead and the cards on the transport means to inhibit the transfer of cards from the transport means to the card holder, and control means coupled to the feedhead and the stackhead and including fluid-operated means for obtaining a pivotable movement of the feedhead to the operative position and of the stackhead to the stand-by position at particular times in a synchronized relationship and for obtaining a pivotable movement of the feedhead to the stand-by position and the stackhead to the operative position at other times in a synchronized relationship.

8. In a system for processing data on a plurality of information storage cards as represented by signal indications on the cards, the system including transport means for the cards and including a card holder disposed in coupled relationship to the transport means and having an opening for the transfer of cards between the card holder and the transport means, the combination of, a feedhead pivotable to a position operatively associated with the cards in the card holder to provide for a transfer of cards from the card holder to the transport means and pivotable to a stand-by position out of operative relationship with the cards in the card holder, fluid-operated means operative upon the feedhead in the operative position of the feedhead and including a valve for obtaining a controlled passage of fluid through the feedhead to hold the cards against transfer from the card holder to the transport means, means operative upon the valve in the operative position of the feedhead for interrupting the flow of fluid through the feedhead at particular times to obtain a transfer of cards from the card holder to the transport means at such times, a stackhead pivotable to a position operatively associated with the cards on the transport means to obtain a transfer of cards from the transport means into the card holder and pivotable to a stand-by position out of operative relationship with the cards on the transport means to prevent any such transfer, and control means including fluid-operated means coupled to the feedhead and the stackhead for obtaining a pivotable movement of the feedhead to the operative position and a concurrent pivotable movement of the stackhead to the stand-by position at particular times and for obtaining a movement of the feedhead to the stand-by position and a concurrent pivotable movement of the stackhead to the operative position at other times.

9. In a system for processing data on a plurality of information storage cards as represented by signal indications on the cards, which system includes a card holder for holding the cards in stacked relationship and also includes movable transport means disposed in coupled relationship to the cards in the card holder for obtaining a transfer of cards to the transport means from the card holder and for obtaining a movement of the cards with the transport means, the combination of, a feedhead pivotable to an operative position providing a coupling with the cards in the card holder to obtain a transfer of cards by the transport means from the card holder and pivotable to a stand-by position inhibiting any such transfer, first control means operative upon the feedhead to obtain a pivotable movement of the feedhead to the operative position at particular times and to the stand-by position at other times, second control means operative upon the cards in the operative position of the feedhead to exert a frictional force against the cards to prevent the transfer of the cards from the card holder to the transport means, and means operative upon the second control means in the operative position of the feedhead to interrupt at particular times the frictional force exerted on the cards to obtain a transfer of the cards from the card holder to the transport means at such times.

10. In a system for processing data on a plurality of information storage cards as represented by signal indications on the cards, which system includes a card holder for holding the cards in stacked relationship and also includes transport means disposed in contiguous relationship to the card holder and movable to obtain a transfer of cards from the card holder to the transport means and to obtain a movement of cards with the transport means, the combination of, a feedhead movable to an operative position providing a coupling of the feedhead with the cards in the card holder for a transfer of cards to the transport means from the card holder and movable to a stand-by position inhibiting any such transfer, first control means coupled to the feedhead in the operative position of the feedhead for producing a vacuum force in the feedhead for imposition against the cards in the card holder to prevent the cards from being transferred from the card holder to the transport means, means including a valve coupled to the first control means in the operative position of the feedhead for providing an interruption in the vacuum force at particular times to obtain a transfer of cards from the card holder to the transport means, second control means including fluid-operated means coupled to the feedhead for obtaining a movement of the feedhead to the operative position at particular times and to the stand-by position at other times, and means coupled to the feedhead in the stand-by position of the feedhead for preventing any vacuum force from being introduced to the feedhead.

11. In a system for processing data on a plurality of information storage cards as represented by signal indications on the cards, the combination of, transport means for the cards, a first card holder disposed relative to the transport means at a first position to maintain the cards in stacked relationship in the card holder and provided with an opening for a transfer of cards between the card holder and the transport means, a second card holder disposed relative to the transport means at a second position displaced from the first position to maintain the cards in stacked relationship in the card holder and provided with an opening for a transfer of cards between the card holder and the transport means, a first feedhead disposed relative to the cards in the first card holder and relative to the transport means and pivotable to an operative position coupling the feedhead to the cards in the card holder to obtain a controlled transfer of cards from the card holder to the transport means and pivotable to a stand-by position out of operative relationship with the cards, a first stackhead disposed relative to the cards in the first card holder and relative to the transport means and pivotable to an operative position coupling the stackhead to the cards on the transport means to obtain a controlled transfer of cards from the transport means to the card holder and pivotable to a stand-by position out of coupled relationship with the cards on the transport means to prevent such transfer, a second feedhead disposed relative to the cards in the second card holder and relative to the transport means and pivotable to an operative relationship coupling the feedhead to the cards in the second card holder to obtain a controlled transfer of cards from the second card holder to the transport means and pivotable to a stand-by position out of coupled relationship with the cards in the card holder, a second stackhead disposed relative to the cards in the second card holder and relative to the transport means and pivotable to an operative position coupling the stackhead to the cards on the transport means to obtain a controlled transfer of cards to the second card holder from the transport means and pivotable to a stand-by position out of coupled relationship with the cards on the transport means to prevent such a transfer, first control means coupled to the first feedhead and to the first stackhead for obtaining a pivotable movement of the first feedhead to the operative position and a concurrent movement of the first stackhead to the stand-by position at first particular times and for obtaining a pivotable movement of the first feedhead to the stand-by position and a concurrent movement of the second feedhead to the operative position at second particular times, and second control means coupled to the second feedhead and the second stackhead and coupled to the first control means for obtaining a pivotable movement of the second feedhead to the stand-by position and a concurrent movement of the second stackhead to the operative position at particular times to obtain a transfer of cards from the first card holder to the second card holder and for obtaining a pivotable movement of the second feedhead to the operative position and a concurrent pivotable movement of the second stackhead to the stand-by position at the second particular times to obtain a transfer of cards from the second card holder to the first card holder.

12. In a system for processing data on a plurality of information storage cards as represented by signal indications on the cards the combination of, rotatable transport means constructed to maintain the cards in fixed position on the periphery of the transport means during the rotation of the transport means, a first card holder disposed relative to the periphery of the transport means at a first position to maintain the cards in stacked relationship in the holder, a second card holder disposed relative to the periphery of the transport means at a second position removed from the first position to maintain the cards in stacked relationship in the card holder, a first feedhead movable to an operative position in coupled relationship with the cards in the first card holder to obtain a controlled transfer of cards from the card holder to the periphery of the transport means and movable to a stand-by position out of coupled relationship with the cards in the first card holder, a first stackhead movable to an operative position in coupled relationship with the cards on the transport means to obtain a controlled transfer of cards from the transport means to the first card holder and movable to a stand-by position out of coupled relationship with the cards on the transport means, a second feedhead movable to an operative position in coupled relationship with the cards in the second card holder to obtain a controlled transfer of cards from the card holder to the periphery of the transport means and movable to a stand-by position out of coupled relationship with the cards in the card holder, a second stackhead movable to an operative position in coupled relationship with the cards on the transport means to obtain a controlled transfer of the cards from the periphery of the transport means to the second card holder and movable to a stand-by position out of coupled relationship with the cards on the transport means, first means coupled to the first feedhead in the operative position of the feedhead for obtaining the passage of fluid through the feedhead to control the transfer of cards from the first card holder to the transport means, means coupled to the first fluid-operated means in the operative position of the first feedhead for producing an interruption in the passage of fluid through the first feedhead to obtain a controlled transfer of cards from the first card holder to the transport means, second means coupled to the second feedhead in the operative position of the feedhead for obtaining the passage of fluid through the feedhead to control the transfer of cards from the second card holder to the transport means, means coupled to the second fluid-operated means in the operative position of the second feedhead for producing an interruption in the passage of fluid through the second feedhead to obtain a controlled transfer of cards from the second card holder to the transport means, first control means operatively coupled to the first feedhead and to the first stackhead for obtaining a movement of the first feedhead to the operative position and a concurrent movement of the first stackhead to the stand-by position at first particular times and for obtaining a movement of the first stackhead to the operative position and a concurrent movement of the first feedhead to the stand-by position at second particular times, second control means operatively coupled to the second feedhead and the second stackhead and responsive to the first control means for obtaining a movement of the second feedhead to the stand-by position and a concurrent movement of the second stackhead to the operative position at the first particular times to obtain a controlled transfer of cards from the first card holder to the second card holder in accordance with interruptions in the passage of fluid through the first feedhead and for obtaining a movement of the second feedhead to the operative position and a concurrent movement of the second stackhead to the stand-by position at the second particular times to provide a transfer of cards from the second card holder to the first card holder in accordance with interruptions in the flow of fluid through the second feedhead.

13. In a system for processing data on a plurality of information storage cards as represented by signal indications on the cards, the system including transport means for the cards, the combination of, a card holder for maintaining the cards in stacked relationship and provided with an opening and disposed relative to the transport means to provide a transfer of cards between the card holder and the transport means and through the opening, a feedhead movable to an operative position in coupled relationship with the cards in the card holder to obtain a controlled transfer of cards to the transport means from the card holder and movable to a stand-by position out of coupled relationship with the cards in the card holder, a stackhead movable to an operative position in coupled relationship with the cards on the transport means to obtain a controlled transfer of cards into the card holder from the transport means and movable to a stand-by position out of coupled relationship with the cards on the transport means to prevent such a transfer, actuating means operative on the feedhead and the stackhead and provided with a cyclic operation to obtain a movement of the stackhead to the operative position and a subsequent movement of the feedhead to the stand-by position in one cycle and to obtain a movement of the feedhead to the operative position and a subsequent movement of the stackhead to the stand-by position in a second cycle, and control means operative upon the actuating means to obtain a selective activation of the actuating means for successive cycles of operation.

14. In a system for processing data on a plurality of information storage cards as represented by signal indications on the cards, the combination of, a card holder for maintaining the cards in stacked relationship and provided with an opening for obtaining a movement of the cards into and out of the card holder, transport means movable in a closed loop and disposed relative to the card holder to obtain a passage of cards through the opening in the card holder and to produce a movement of the cards in accordance with the movement of the transport means, a feedhead disposed at one end of the opening in the card holder and movable to a position operative upon the cards in the card holder for a controlled transfer of cards from the card holder and movable to a stand-by position out of coupled relationship with the cards in the card holder, a stackhead disposed at the opposite end of the opening in the card holder and movable to a position operative upon the cards on the transport means for a controlled transfer of cards into the card holder from the transport means and movable to a stand-by position out of coupled relationship with the cards on the transport means, first actuating means operative on a cyclic basis and coupled to the feedhead and the stackhead for obtaining a movement of the stackhead to the operative position and a subsequent movement of the feedhead to the stand-by position in one cycle and for obtaining a movement of the feedhead to the operative position and a subsequent movement of the stackhead to the stand-by position in a second cycle, means including an actuatab'e valve coupled to the feedhead in the operative position of the feedhead for producing a vacuum pressure in the feedhead to prevent the transfer of cards from the card holder to the transport means, electrical circuitry including switching means operative upon the valve to obtain an interruption in the vacuum pressure in the feedhead upon an actuation of the switching means, second actuating means coupled to the first actuating means and operative upon the switching means to actuate the switching means upon the movement of the feedhead to the stand-by position, means coupled to the valve in the operative position of the feedhead for obtaining a selective actuation of the switching means to obtain a controlled transfer of cards from the holder to the transport means, and control means coupled to the first actuating means for obtaining successive cyclic operations of the first actuating means.

15. In a system for processing data on a plurality of information storage cards as represented by signal indications on the cards, the combination of, a card holder for holding the cards in stacked relationship, transport means disposed relative to the card holder for obtaining a transfer of cards between the card holder and the transport means, a feedhead movable to a position operative upon the cards in the card holder to obtain a controlled transfer of cards from the card holder to the transport means and movable to a stand-by position out of operative relationship with the cards in the card holder, a stackhead movable to a position operative upon the cards on the transport means to obtain a controlled transfer of cards into the card holder from the transport means and movable to a stand-by position out of operative relationship with the cards on the transport means, switching means including a switching member mounted on the feedhead for obtaining an actuation of the switching means upon the transfer of the last card from the card holder to the transport means, actuating means coupled to the feedhead and to the stackhead and operative on a cyclic basis to obtain a movement of the feedhead to the operative position and a concurrent movement of the stackhead to the stand-by position in a first cycle and to obtain a movement of the feedhead to the stand-by position and a concurrent movement of the stackhead to the operative position in a second cycle, and control means coupled to the actuating means and responsive to the activation of the switching means in the first cycle of operation to obtain the operation of the actuating means in the second cycle.

16. In a system for processing data on a plurality of information storage cards as represented by signal indications on the cards, transport means for the cards, a card holder constructed to maintain the cards in stacked relationship and disposed relative to the transport means for providing a transfer of the cards between the card holder and the transport means, a lifter member disposed in contiguous relationship with the transport means and provided with a configuration to displace the transported cards from the transport means as such cards move past the lifter member, and a feedhead movable to a first position in coupled relationship to the cards in the card holder and under the trailing edge of a card positioned on the lifter member for positioning of the cards by the lifter member and the feedhead to provide a controlled transfer of the cards to the transport means and movable to a second position out of coupled relationship with the cards in the card holder.

17. In a system for processing data on a plurality of information storage cards as represented by signal indications on the cards, which system includes transport means for the cards, the combination of, a card holder constructed to maintain the cards in stacked relationship and disposed relative to the transport means and provided with an opening to obtain a transfer of cards between the card holder and the transport means and through the opening, a lifter member disposed near a first end of the opening in the card holder and extending into coupled relationship with the transport means to initially remove the transported cards from the transport means, a feedhead positioned near the first side of the opening in the card holder and coupled to the cards in the card holder in a first position to obtain a controlled transfer of cards from the card holder to the transport means and disposed in a second position out of coupled relationship with the cards in the card holder, a stackhead positioned near a second end of the opening in the card holder opposite to the first end and coupled to the cards in the transport means in a first position to arrest the transported cards and to hold such cards with the trailing ends of the cards disposed on the lifter member for a movement of the cards into the card holder in an order corresponding to their movement on the transport means and disposed in a second position out of coupled relationship with the cards on the transport means, and means coupled to the feedhead and to the stackhead for obtaining a movement of the feedhead to the first position in a path moving under the trailing edges of the cards positioned on the lifter member for co-operation by the lifter member and the feedhead in obtaining a controlled transfer of the cards to the transport means and for obtaining a concurrent movement of the stackhead to the second position at the first particular times and for obtaining a movement of the feedhead to the second position and a concurrent movement of the stackhead to the first position at second particular times.

18. In a system for processing data on a plurality of information storage cards as represented by signal indications on the cards, the combination of, transport means for the cards, a card holder positioned relative to the transport means for maintaining the cards in stacked relationship and constructed to obtain a transfer of cards between the card holder and the transport means, a lifter member mounted adjacent the first side of the card holder and extending into contiguous relationship with the transport means to displace the transported cards from the transport means, a feedhead positioned adjacent the first side of the card holder and pivotable to a first position in coupled relationship with the cards in the card holder for a controlled transfer of the cards from the card holder to the transport means and pivotable to a second position out of coupled relationship with the cards in the card holder, a stackhead positioned adjacent the opposite side of the card holder and pivotable to a first position in coupled relationship with the cards on the transport means to arrest the transported cards and to hold the cards with the trailing ends disposed on the lifter member for a movement of the cards into the card holder in an order corresponding to the movements of the transported cards and pivotable to a stand-by position out of coupled relationship with the cards on the transport means, and means coupled to the feedhead and the stackhead for obtaining a pivotal movement of the feedhead from the second position to the first position in a path passing under the trailing ends of the cards positioned on the lifter member for a co-operation between the lifter member and the feedhead in positioning the cards for a controlled transfer of the cards from the card holder to the transport means and for obtaining a concurrent pivotal movement of the stackhead to the second position.

19. In a system for processing data on a plurality of information storage cards as represented by signal indications on the cards, the combination of, a card holder for maintaining the cards in a stacked relationship, transport means for the cards and disposed relative to the cards in the card holder to obtain a transfer of cards from the card holder to the transport means, means coupled to the cards in the card holder for obtaining a controlled transfer of cards from the card holder to the transport means, and a switch including a first switching member disposed on the last mentioned means and including a second switching member disposed in the card holder and variably positioned at a distance from the transport means in accordance with the transfer of cards between the card holder and the transport means to obtain a co-operative relationship with the first switching member upon a transfer of the last card in the card holder from the card holder to the transport means.

20. In a system for processing data on a plurality of information storage cards as represented by signal indications on the cards, the combination of, a card holder for maintaining the cards in stacked relationship and provided with an opening to obtain a transfer of cards into or out of the card holder, transport means for the cards and positioned adjacent the opening in the card holder to provide a transfer of cards between the card holder and the transport means, a feedhead disposed in coupled relationship to the cards in the card holder for obtaining a controlled transfer of cards from the card holder to the transport means, a first switch member mounted on the feedhead, and a second switch member movable in accordance with the transfer of cards between the card holder and the transport means to establish a circuit with the first switch member upon the transfer from the card holder to the transport means of the last card in the card holder.

21. In a system for processing data on a plurality of information storage cards represented by signal indications on the cards, the combination of, a card holder for maintaining the cards in stacked relationship and provided with an opening for the transfer of cards, movable transporting means positioned adjacent the opening in the card holder to provide a transfer of cards from the card holder to the transporting means and for providing a movement of the transferred cards with the transporting means, a feedhead operative upon the cards in the card holder to obtain a controlled transfer of cards from the card holder to the transporting means, a pusher member for resiliently biasing the cards in the card holder toward the feedhead, first switch means mounted on the feedhead, and second switch means carried by the pusher member to establish an electrical circuit with the first switch member upon the transfer from the card holder to the transporting means of the last card in the card holder.

22. In a system for processing data on a plurality of information storage cards as represented by signal indications on the cards, the combination of, transport means for the cards, a card holder for maintaining the cards in stacked relationship and disposed relative to the transport means to obtain a transfer of cards between the card holder and the transport means, a feedhead disposed in coupled relationship to the cards in the card holder in a first position for obtaining a controlled transfer of cards from the card holder to the transport means and disposed out of coupled relationship with the cards in the card holder in a second position, switch contact means including a contact movable toward the transport means upon a transfer of cards out of the card holder for obtaining a closure of the switch contact means when a last card has left the card holder, a stackhead disposed in a first position in coupled relationship to the cards on the transport means for obtaining a controlled transfer of cards into the card holder from the transport means and disposed out of coupled relationship with the cards on the transport means in the second position, means for obtaining a movement of the feedhead to the first position and a subsequent movement of the stackhead to the second position in one cycle and for obtaining a movement of the stackhead to the first position and a subsequent movement of the feedhead to the second position in a second cycle, and control means responsive to the closure of the switch contact means for obtaining an operation of the last mentioned means in the second cycle.

23. In a system for processing data on a plurality of information storage cards as represented by signal indications on the cards, which system includes transport means for the cards, the combination of, a card holder provided with a pair of spaced walls for maintaining cards in stacked relationship between the walls and disposed relative to the transport means to provide a transfer of cards from the transport means to the card holder, a stackhead pivotable to an operative position in the space between the pair of walls and coupling the head to the cards on the transport means in the operative position and disposed in the operative position relative to the transport means and to the card holder to obtain a controlled transfer of cards from the transport means into the space between the pair of walls in the card holder and pivotable to a standby position away from the space between the pair of walls and decoupling the stackhead from the cards on the transport means in the stand-by position to prevent a transfer of cards from the transport means, and control means operatively coupled to the stackhead for obtaining a pivotal movement of the stackhead to the operative position at particular times and to the standby position at other times.

24. In a system for processing data on a plurality of information storage cards as represented by signal indications on the cards, the combination of, transport means for the cards, a card holder having a pair of spaced walls disposed relative to the transport means to receive cards from the transport means in the space between the walls and constructed to hold the cards in stacked relationship in the space between the walls, a stackhead movable to an operative position between the spaced walls and operatively associated with the cards on the transport means in the operative position to obtain a transfer of cards from the transport means into the card holder and movable to a standby position away from the space between the walls and out of operative relationship with the cards on the transport means to prevent any such transfer, and control means including fluid-operated means coupled to the stackhead for obtaining a movement of the stackhead to the operative position at particular times and a movement of the stackhead to the standby position at other times.

25. In a system for processing data on a plurality of information storage cards as represented by signal indications on the cards, the combination of, transport means for the cards, a card holder provided with a pair of spaced walls and constructed to maintain the cards in stacked relationship between the walls and provided with an opening and disposed relative to the transport means to provide a transfer of cards from the transport means to the card holder through the opening in the card holder, a stackhead movable to an operative position in the space between the walls in the card holder and in coupled relationship with the cards on the transport means to obtain a controlled transfer of cards into the card holder from the transport means and movable to a standby position out of coupled relationship with the cards on the transport means and away from the space between the walls in the card holder to prevent such a transfer, actuating means operatively coupled to the stackhead and provided with a cyclic operation to obtain a movement of the stackhead to the operative position in one cycle and to obtain a movement of the stackhead to the stand-by position in a second cycle, and control means operative upon the actuating means to obtain a selective activation of the actuating means to the operative and stand-by positions of the stackhead in successive cycles of operation.

26. The system set forth in claim 20 in which the first switch member and the second switch member constitute contact means and in which the second contact means engages the first contact means upon the transfer from the card holder to the transport means of the last card in the card holder.

27. The system set forth in claim 21 in which the first switch means constitutes a contact mounted on the feedhead and in which the second switch means constitutes a conductive contact strip carried by the pusher member to establish contact with the switch contact means upon the transfer from the card holder to the transporting means of the last card in the card holder.

28. The system set forth in claim 25 in which the actuating means is movable only in a single direction on a cyclic basis and in which the control means is operative upon the actuating means to obtain a selective movement of the actuating means in the single direction to the operative and stand-by positions in the successive cycles of operation.

29. In a system for processing data on a plurality of information storage cards as represented by signal indications on the cards, which system includes transport means for the cards, the combination of: a card holder provided with a pair of spaced walls for maintaining cards in stacked relationship between the walls and disposed relative to the transport means to provide a transfer of cards from the card holder to the transport means, a feedhead pivotable to an operative position in the space between the pair of walls and coupling the head to the cards in the card holder in the operative position and disposed in the operative position relative to the transport means and to the card holder to obtain a controlled transfer of cards from the space between the pair of walls in the card holder to the transport means and pivotable to a stand-by position away from the space between the pair of walls and decoupling the feedhead from the cards in the card holder in the stand-by position to prevent the transfer of cards from the card holder to the transport means, and control means operatively coupled to the feedhead for obtaining a pivotal movement of the feedhead to the operative position at particular times and to the stand-by position at other times.

30. In a system for processing data on a plurality of information storage cards as represented by signal indications on the cards, the combination of: transport means for the cards, a card holder having a pair of spaced walls disposed relative to the transport means to obtain a transfer of cards to the transport means from the space between the walls of the card holder and constructed to hold the cards in stacked relationship in the space between the walls, a feedhead movable to an operative position between the spaced walls and operatively associated with the cards in the card holder in the operative position to obtain a transfer of cards to the transport means from the card holder and movable to a stand-by position away from the space between the walls and out of operative relationship with the cards in the card holder to prevent any such transfer, and control means including fluid-operated means coupled to the feedhead for obtaining a movement of the feedhead to the operative position at particular times and a movement of the feedhead to the stand-by position at other times.

31. In a system for processing data on a plurality of information storage cards as represented by signal indications on the cards, the combination of: transport means for the cards, a card holder provided with a pair of spaced walls and constructed to maintain the cards in stacked relationship between the walls and provided with an opening and disposed relative to the transport means to provide a transfer of cards to the transport means from the space between the walls and through the opening in the card holder, a feedhead movable to an operative position in the space between the walls in the card holder and in coupled relationship with the cards in the card holder to obtain a controlled transfer of cards to the transport means from the space between the walls in the card holder and movable to a stand-by position out of coupled relationship with the cards in the card holder and away from the space between the walls in the card holder to prevent such a transfer, actuating means operatively coupled to the feedhead and provided with a cyclic operation to obtain a movement of the feedhead to the operative position in one cycle and to obtain a movement of the feedhead to the stand-by position in a second cycle, and control means operative upon the actuating means to obtain a selective activation of the actuating means to the operative and stand-by positions in successive cycles of computation.

32. The combination set forth in claim 31 in which the actuating means is movable only in a single direction on a cyclic basis to obtain a movement of the feedhead to the operative position in one cycle and to obtain a movement of the feedhead to the stand-by position in the second cycle and in which the control means are operative upon the actuating means to obtain a movement of the actuating means in the single direction on the cyclic basis.

References Cited in the file of this patent
UNITED STATES PATENTS

| 1,040,025 | Schlesinger | Oct. 1, 1912 |
| 1,053,781 | Brown | Feb. 18, 1913 |
| 2,034,903 | Hernlund et al. | Mar. 24, 1936 |
| 2,331,533 | Bishop | Oct. 12, 1943 |
| 2,609,779 | Goldsworthy | Sept. 9, 1952 |
| 2,643,120 | Jackson | June 23, 1953 |
| 2,704,209 | Halahan et al. | Mar. 15, 1955 |
| 2,749,117 | Chew | June 5, 1956 |
| 2,811,352 | Bornemann | Oct. 29, 1957 |